(12) United States Patent
Watariuchi

(10) Patent No.: US 9,906,400 B2
(45) Date of Patent: Feb. 27, 2018

(54) MANAGEMENT SYSTEM, CONTROL METHOD IN THE MANAGEMENT SYSTEM, AND STORAGE MEDIUM THEREOF

(71) Applicant: CANON KABUSHIKI KAISHA, Tokyo (JP)

(72) Inventor: Satoki Watariuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 230 days.

(21) Appl. No.: 14/565,531

(22) Filed: Dec. 10, 2014

(65) Prior Publication Data

US 2015/0188748 A1 Jul. 2, 2015

(30) Foreign Application Priority Data

Dec. 27, 2013 (JP) .................................. 2013-273534

(51) Int. Cl.
*G06F 15/177* (2006.01)
*H04L 12/24* (2006.01)

(52) U.S. Cl.
CPC .......... *H04L 41/046* (2013.01); *H04L 41/082* (2013.01); *H04L 41/0866* (2013.01)

(58) Field of Classification Search
CPC . H04L 41/046; H04L 41/0803; H04L 41/082; H04L 41/0866
USPC ........................................ 709/220, 223, 230
See application file for complete search history.

(56) References Cited

U.S. PATENT DOCUMENTS

| | | | | | |
|---|---|---|---|---|---|
| 6,131,118 | A | * | 10/2000 | Stupek, Jr. | .............. G06F 9/542 709/223 |
| 7,051,097 | B1 | * | 5/2006 | Pecina | .................... H04L 67/34 707/999.104 |
| 7,653,712 | B1 | * | 1/2010 | Dubrovsky | ......... H04L 41/0853 709/223 |
| 7,783,733 | B1 | * | 8/2010 | Yip | ..................... H04L 41/0213 709/220 |

(Continued)

FOREIGN PATENT DOCUMENTS

| | | |
|---|---|---|
| JP | 2007-130838 A | 5/2007 |
| JP | 2013-250611 A | 12/2013 |

OTHER PUBLICATIONS

Korean Office Action dated Jun. 7, 2016, in counterpart KR application No. 10-2014-0182976 (13 pages).

*Primary Examiner* — Michael Y Won
(74) *Attorney, Agent, or Firm* — Fitzpatrick, Cella, Harper & Scinto

(57) ABSTRACT

A management system includes a plurality of network devices, and a management server that manages a plurality of setting values to be set in the plurality of network devices. The network device includes a request unit configured to perform a request of a setting value to be set; a setting unit configured to set the acquired setting value; an execution unit configured to execute an import processing; a notification unit configured to perform a notification of a start of the import processing; a control unit configured to control the request between the start and a completion of the import processing; and a transmission unit configured to transmit a setting value after the import processing. The management server includes a response unit configured to respond an error to the request from the network device; and an application unit configured to apply the setting value after the import processing.

17 Claims, 18 Drawing Sheets

(56) References Cited

U.S. PATENT DOCUMENTS

| | | | | |
|---|---|---|---|---|
| 7,886,021 | B2* | 2/2011 | Scheifler | G06F 9/485 709/217 |
| 8,180,867 | B2* | 5/2012 | Wan | G06F 11/3006 709/217 |
| 8,935,444 | B2* | 1/2015 | Umeo | G08C 19/00 709/208 |
| 9,063,686 | B2 | 6/2015 | Suzuki | |
| 2002/0097427 | A1* | 7/2002 | Kazama | G06F 3/1288 358/1.15 |
| 2003/0055529 | A1* | 3/2003 | Aosawa | H04L 41/0883 700/220 |
| 2003/0135596 | A1* | 7/2003 | Moyer | H04L 41/5054 709/223 |
| 2004/0049566 | A1* | 3/2004 | Mattila | H04L 41/024 709/223 |
| 2006/0082817 | A1* | 4/2006 | Crosier | H04L 41/0806 358/1.15 |
| 2011/0238792 | A1* | 9/2011 | Phillips | G06F 15/177 709/220 |
| 2012/0144002 | A1* | 6/2012 | Naganuma | G06F 3/0605 709/220 |
| 2013/0321834 | A1* | 12/2013 | Suzuki | G06F 3/1293 358/1.13 |
| 2014/0078551 | A1* | 3/2014 | Haba | G06F 3/1212 358/1.15 |
| 2015/0188748 | A1* | 7/2015 | Watariuchi | H04L 41/046 709/220 |
| 2015/0237002 | A1* | 8/2015 | Baniqued | H04L 41/0803 709/220 |
| 2016/0006886 | A1* | 1/2016 | Sato | H04N 1/00965 358/1.15 |

* cited by examiner

FIG. 4A

| Setting value identifier | Default value | Value range | Condition |
|---|---|---|---|
| copy_settings.nup | 1in1 | 1 in 1, 2 in 1, 4 in 1 | Not avilable |
| device_settings.cloud_address | "http://canon.com/config" | 256 bytes | Not avilable |
| device_settings.cloud_interval | 5 minutes | 30 seconds, 1 minute, 5 minutes, 10 minutes, 30 minutes | Not avilable |
| device_settings.sleep_time | 10 minutes | 1 minute, 10 minutes, 1 hour | Not avilable |
| fax_settings.received_print | OFF | ON,OFF | Facsimile unit |
| box_settings.server_address | "" | 256 bytes | Not avilable |

FIG. 4B

| Setting value identifier | Default value | Value range | Condition |
|---|---|---|---|
| copy_settings.nup | 1in1 | 1 in 1, 2 in 1, 4 in 1 | Not avilable |
| device_settings.cloud_address | "http://canon.com/config" | 256 bytes | Not avilable |
| device_settings.cloud_interval | 30 seconds | 30 seconds, 1 minute, 5 minutes, 10 minutes, 30 minutes | Not avilable |
| device_settings.sleep_time | 10 seconds | 10 seconds, 1 minute, 10 minutes, 1 hour | Not avilable |
| fax_settings.received_print | OFF | ON, OFF | Facsimile unit |

FIG. 5

| Setting value identifier (502) | Value (503) |
|---|---|
| copy_settings.nup | 2 in 1 |
| device_settings.cloud_address | "http://canon.com/config" |
| device_settings.cloud_interval | 5 minutes |
| device_settings.sleep_time | 10 seconds |
| fax_settings.received_print | ON |
| box_settings.server_address | "http://192.168.1.1/server/" |

FIG. 6A

| Data type (602) | Value (603) |
|---|---|
| Model code | 0x01 |
| Firmware version | 00.01 |
| Device identifier | 010001 |
| Facisimile unit | Not avilable |

FIG. 6B

| Data type (602) | Value (603) |
|---|---|
| Model code | 0x01 |
| Firmware version | 00.01 |
| Device identifier | 010002 |
| Facisimile unit | Avilable |

FIG. 6C

| Data type (602) | Value (603) |
|---|---|
| Model code | 0x02 |
| Firmware version | 01.00 |
| Device identifier | 020001 |
| Facisimile unit | Avilable |

FIG. 8

| Device identifier | Tenant identifier | Virtual device configuration data | Virtual configuration data | Notification flag | Import flag |
|---|---|---|---|---|---|
| 010001 | 100 | 1 | 1 | Not-notified | Notified |
| 010002 | 100 | 2 | 2 | Not-notified | Not-notified |
| 020001 | 100 | 3 | 3 | Notified | Notified |
| 010010 | 200 | 4 | 4 | Notified | Notified |

| Setting value identifier | Value |
|---|---|
| copy_settings.nup | 1in1 |
| device_settings.sleep_time | 5 minutes |

| Tenant identifier | Importing flag | Import device identifier | Import completion estimated time |
|---|---|---|---|
| 100 | YES | 010001 | 2013/09/19 23:30:35 |
| 200 | NO | - | - |

1002, 1003, 1004, 1005

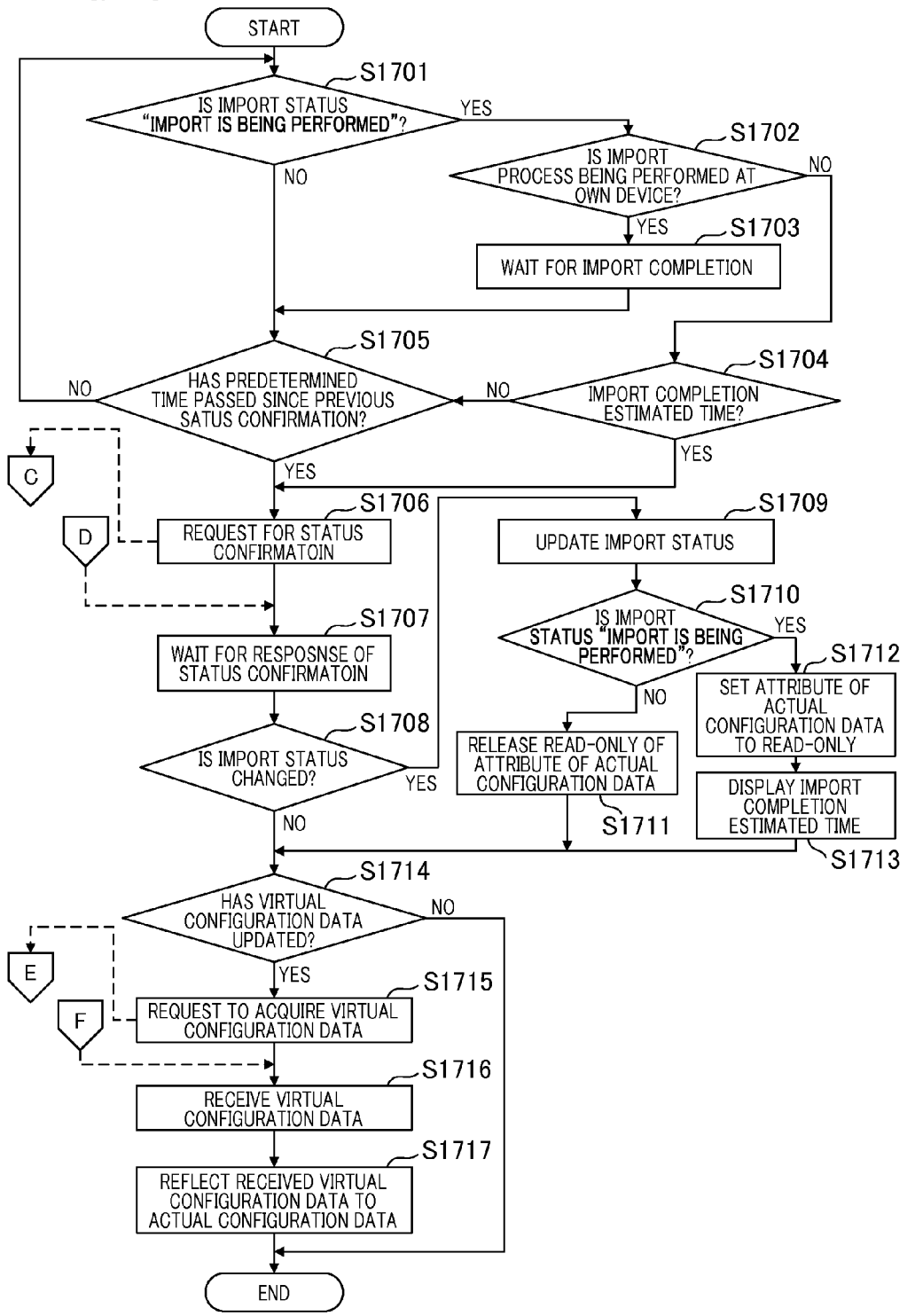

MANAGEMENT SYSTEM, CONTROL METHOD IN THE MANAGEMENT SYSTEM, AND STORAGE MEDIUM THEREOF

BACKGROUND OF THE INVENTION

Field of the Invention

The present invention relates to a management system, a control method in the management system, and a storage medium thereof, and in particular, relates to a system that manages a setting value (configuration data) for switching the operations of an image forming apparatus at collective management.

Description of the Related Art

Conventionally, there is an image forming apparatus that stores a setting value (configuration data) for switching the operations of the image forming apparatus. The setting changes in configuration data need to be made by the number of image forming apparatuses in order to change the configuration data for all of the image forming apparatuses because the configuration data is stored in a storage unit provided in each of the image forming apparatuses.

For saving the time relating to the settings, Japanese Patent Laid-Open No. 2007-130838 discloses a technique for managing the configuration data at collective management. Specifically, the settings of configuration data for a plurality of image forming apparatuses are made at collective management by a certain information processing apparatus, and the configuration data is disposed at a place capable of referring to a network, and the plurality of image forming apparatuses refer the configuration data, whereby the management is performed at collective management. In addition, a technique is disclosed whereby a certain image forming apparatus that has performed the change notifies a server of the changed content about the change of the configuration data performed by the certain image forming apparatus, and the other image forming apparatuses receive the changed content, whereby the configuration data is synchronized in the plurality of image forming apparatuses.

However, in the Japanese Patent Laid-Open No. 2007-130838, an inconsistency may occur to the configuration data between the certain image forming apparatus and other image forming apparatuses, if a configuration data group that is recorded in a USB memory or the like is imported to the certain image forming apparatus. Specifically, a plurality of configuration data relating to other image forming apparatuses are applied at different timings by continuously notifying the server of the configuration data that is changed by the import. In this case, the setting of the image forming apparatus may become an unintended state. In addition, if the setting change contrary to the import data in other image forming apparatuses is performed during performing the import or before the import data is applied, the setting of the image forming apparatus may become an unintended state.

SUMMARY OF THE INVENTION

The present invention provides a management system that enables applying configuration data without inconsistencies of the values, if an import processing is performed in a plurality of image forming apparatuses, in the management system that synchronizes configuration data of the plurality of image forming apparatuses through a server.

According to an embodiment of the present invention, a management system that includes a plurality of network devices, and a management server that manages a plurality of setting values to be set in the plurality of network devices as master data is provided that the network device includes a request unit configured to perform a request of a setting value to be set to the management server; a setting unit configured to set a setting value acquired from the management server based on the request, in the network device; an execution unit configured to execute an import processing for setting a setting value included in import data, which is not the setting value acquired from the management server; a notification unit configured to perform a notification of a start of the import processing in response to the execution of the import processing to the management server; a control unit configured to control the request performed by the request unit between the start and a completion of the import processing executed by the execution unit; and a transmission unit configured to transmit a setting value after the import processing to the management server for applying to the master data in response to the completion of the import processing, and the management server includes a response unit configured to respond an error to the request from the network device based on the notification by the notification unit; and an application unit configured to apply the setting value after the import processing, which is transmitted from the transmission unit, in the master data.

According to the present invention, in the management system that synchronizes the configuration data of the plurality of image forming apparatuses through the server, a consistency of the setting can be properly taken for the other image forming apparatuses even if the configuration data group is imported at the image forming apparatus side.

Further features of the present invention will become apparent from the following description of exemplary embodiments with reference to the attached drawings.

BRIEF DESCRIPTION OF THE DRAWINGS

FIGS. 4A and 4B are diagrams respectively illustrating one example of model-specific setting value schema.

FIG. 5 is a diagram illustrating an example of tenant configuration data.

FIGS. 6A to 6C are diagrams respectively illustrating one example of actual device configuration data.

FIG. 8 is a diagram illustrating a configuration of a virtual device holding unit.

FIG. 9 is a diagram illustrating a configuration of a difference holding unit.

FIG. 10 is a diagram illustrating a configuration of an import status holding unit.

FIG. 18 is a flowchart illustrating a status confirming processing.

DESCRIPTION OF THE EMBODIMENTS

Figure 1:
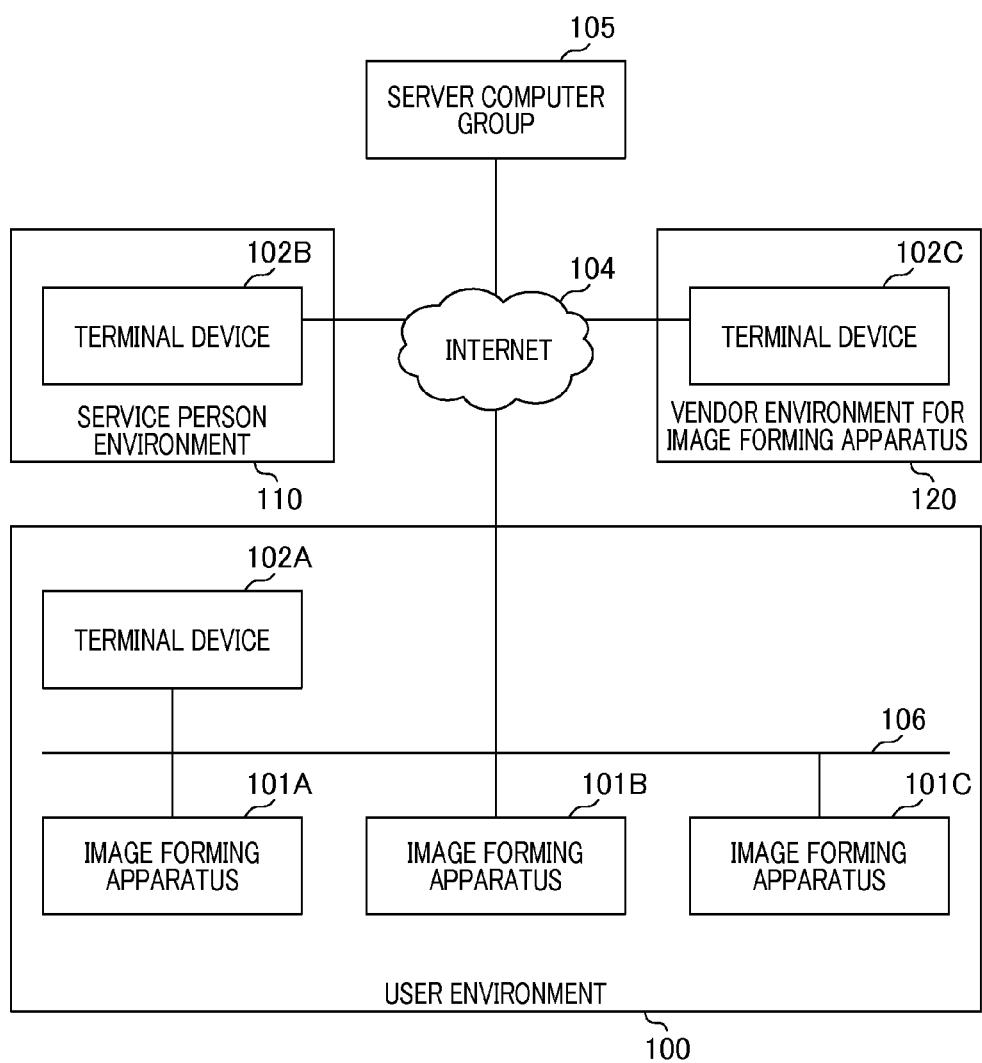
FIG. 1 is a diagram illustrating a network configuration of a plurality of image forming apparatuses.

Hereinafter, preferred embodiments of the present invention will be described with reference to the drawings and the like.

First, the terms used in the present specification are defined. The term "setting value" (configuration data) refers to data for switching the operations of an image forming apparatus. For example, it corresponds to a default value for imposition of a copy job or the like. If the default value for imposition of a copy job is set to "1 in 1", one page is printed on a single sheet of paper as a result of copying. If the default value for imposition of a copy job is set to "2 in 1", two pages are printed on a single sheet of paper as a result of copying.

The term "device configuration data" refers to data indicating a configuration of a device provided in the image forming apparatus. For example, it corresponds to data indicating whether or not a facsimile unit is included. Moreover, a model code for uniquely identifying the model of the image forming apparatus, a running firmware version, and the like are also included.

The term "model-specific setting value schema" refers to data for defining the schema of configuration data that is held by a specific model of an image forming apparatus. Here, the term "schema" refers to data for defining the convention and positioning for the configuration data. For example, model-specific setting value schema include several conditions for validating the setting value identifier, the default value, the value range, and data for each configuration data are included. It is assumed that there is a difference between the configuration data to be held depending on the model of the image forming apparatus and a setting value schema are prepared for different models.

The term "virtual device" refers to a data group of actual devices held by a server computer group. Specifically, at least device configuration data and configuration data are included. The term "tenant" refers to a unit of a consignor to whom a user consigns the management of an image forming apparatus. In addition, the term "tenant identifier" refers to an identifier for uniquely identifying a tenant. For example, assume the case where management of three image forming apparatuses in a user environment is consigned to a tenant by a certain company. In this case, a corresponding tenant identifier is assigned to the user environment and the three image forming apparatuses are recognized as the image forming apparatuses belonging to the tenant and managed at collective management.

Here, the following definitions are given so as to distinctly designate data included in a virtual device, data held by an actual device, and data dedicated for a tenant. Device configuration data included in a virtual device is referred to as virtual device configuration data and a setting value (configuration data) of the virtual device is referred to as a virtual setting value (virtual configuration data). Device configuration data held by an actual device is referred to as actual device configuration data and a setting value (configuration data) of the actual device is referred to as an actual setting value (actual configuration data). A setting value (configuration data) that is hoped to be commonly used in the tenant is referred to as a tenant setting value (tenant configuration data). Note that other descriptions will be appropriately given besides the descriptions here.

First Embodiment

One example of a network configuration (management system) of a plurality of image forming apparatuses according to the present embodiment will be described using FIG. 1. Image forming apparatuses 101 (101A to 101C) are managed at collective management by a management service 350 described below, and each can access the Internet 104 through a network 106. The image forming apparatus 101 may be a multifunction device (network device) for realizing a variety of functions (copy, facsimile, and the like). Communication between the user environment 100 and vendor environment 120 for the image forming apparatuses is carried out via the Internet 104.

A terminal device 102A is a computer that is operable by a user of the user environment 100 and can access the Internet 104 via the network 106. In addition, a terminal device 102B is a computer that is operable by a service person or the like who manages the image forming apparatus 101 and can access the Internet 104. Further, a terminal device 102C is a computer that is operable by management personnel or the like who belong to a vendor for producing the image forming apparatus 101, and can access the Internet 104. Note that the Internet 104 is a computer network that is capable of providing digital communication on a public line that is interconnected by utilizing a communication technique such as internet protocol.

The server computer group 105 is a server group for providing a plurality of services through the Internet 104. A network 106 is a network that is capable of providing digital communication in the user environment 100. A service person environment 110 is an environment where a service person manages the image forming apparatus using the terminal device 102B. A vendor environment 120 for the image forming apparatuses is an environment where management personnel of a vendor for producing the image forming apparatus perform the maintenance of data which is required for the management of the image forming apparatus, using a terminal device 102C.

Note that, in the configuration of the management system shown in FIG. 1, it is assumed that the service person utilizes the terminal device 102B that is disposed in the service person environment 110, however, another configuration may be employed. For example, a configuration in which the service person utilizes the terminal device 102A disposed in the user environment 100 under permission of the user, may be employed.

Figure 2:
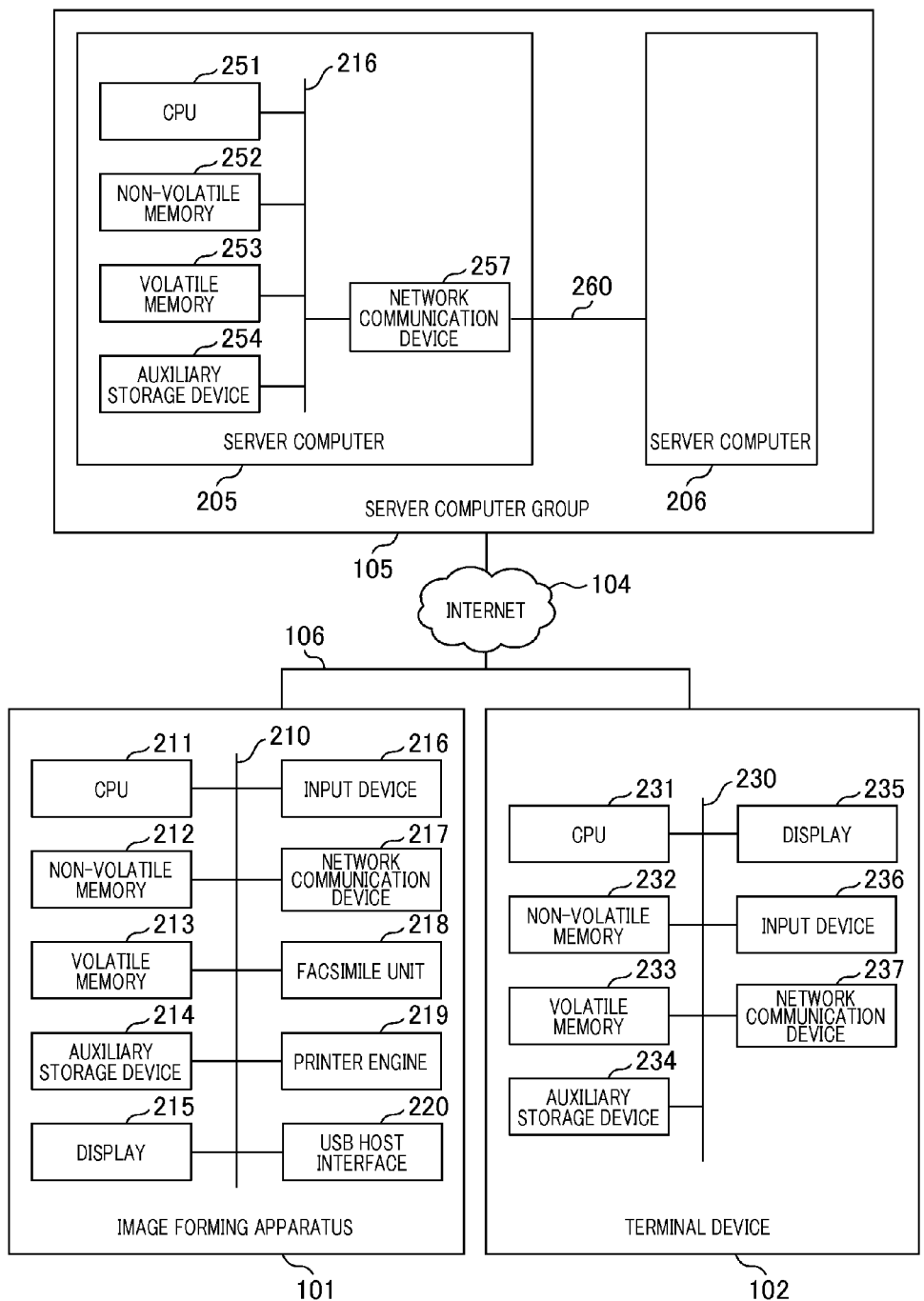
FIG. 2 is a diagram illustrating a hardware configuration of each apparatus shown in FIG. 1.

Next, one example of a hardware configuration of the image forming apparatus 101, the terminal device 102, and the server computer group 105 will be described using FIG. 2. Note that in a hardware configuration diagram shown in FIG. 2, server computers 205 and 206 communicate with each other through a network 260, however, another configuration may be employed. For example, the server computers 205 and 260 may communicate with each other through the Internet 104.

First, a CPU (Central Processing Unit) 211 of the image forming apparatus 101 executes programs and controls various types of processing. A non-volatile memory 212 is configured from a ROM (Read Only Memory) and stores programs and data, and the like which are required for the initial stage in the device startup processing. A volatile memory 213 is configured from a RAM (Random Access Memory) and is utilized as a temporary storage location of the programs and data.

An auxiliary storage device 214 is configured from a large-capacity storage device such as a hard disk, a RAM drive, or the like and stores large-capacity data and holds an execution code of the programs. It stores data which needs to be held for a longer time than that of the volatile memory 213. The auxiliary storage device 214 is a non-volatile storage device, and therefore it is capable of continuing to store the data even if the power is OFF.

A display 215 is a device that notifies a user person and the like of information. In the present embodiment, a user person denotes a user and a service person. An input device 216 is a device that receives a user person's selection instruction and transmits the instruction to a program through an internal bus 210. A network communication device 217 is a device that communicates with other information processing device(s) through a network. A facsimile unit 218 is a hardware unit that transmits image data formed by the image forming apparatus 101 or image data stored in the auxiliary storage device to other information device(s) through the network 106. The facsimile unit 218 is an option and therefore it may not be included depending on the apparatus.

A printer engine 219 has functions for printing the image data formed by the image forming apparatus 101 or the image data stored in the auxiliary storage device on a paper medium. A USB host interface 220 is an interface that enables utilizing a connected USB device. The internal bus 210 is a communication bus that connects the CPU 211, the non-volatile memory 212, the volatile memory 213, the auxiliary storage device 214, the display 215, the input device 216, and the network communication device 217 in the image forming apparatus 101, in a communicable state.

Next, the terminal device 102 includes a CPU 231, a non-volatile memory 232, a volatile memory 233, an auxiliary storage device 234, a display 235, an input device 236, and a network communication device 237, and they are connected to each other through an internal bus 230. The CPU 231 to the network communication device 237 of the terminal device 102 are respectively similar to the CPU 211 to the network communication device 217 of the image forming apparatus 101, and therefore detailed descriptions thereof are omitted.

Next, the server computer group 105 is configured of a plurality of server computers 205 and 206 connected through a network 260. An internal bus 250 is a communication bus that connects a CPU 251, a non-volatile memory 252, a volatile memory 253, an auxiliary storage device 254, and a network communication device 257 which are provided in the server computer 205 in a communicable state in the server computer 205.

A network 260 is a network that enables a high speed communication between the server computers which configure the server computer group 105. Note that, a hardware configuration of the terminal device 102 is the same as the hardware configuration of the image forming apparatus 101, excluding a facsimile unit 218 and a printer engine 219. Therefore, a detailed description thereof is omitted.

Next, one example of a software configuration of a management service 350 that is executed by one server computer in the server computer group 105 and the image forming apparatus 101 will be described by using FIG. 3. First, a description will be given of a software configuration that is included in the image forming apparatus 101. Note that, in the present embodiment, intercommunication is performed through the Internet 104, however, the present embodiment is not limit to Internet, and other communication techniques such as a LAN may be used.

In addition, it is assumed that the management service 350 is executed by any of the server computers in the server computer group 105, however, another configuration may be employed. For example, the server computer group 105 may be configured of a single server computer 205 only. Alternately, it may be configured in the user environment 100, the service person environment 110, and the vendor environment 120 of the image forming apparatus, or the like.

The actual configuration data holding unit 301 holds the configuration data of the image forming apparatus 101 in the auxiliary storage device 214, and the image forming apparatus 101 switches its operational behavior based on the held actual configuration data. A virtual configuration data application unit 302 applies virtual configuration data that is received at a virtual configuration data receiving unit 303 described below in the actual configuration data held by the actual configuration data holding unit 301.

The virtual configuration data receiving unit 303 calls a virtual configuration data acquiring unit 360 described below and receives the virtual configuration data. As the address for calling the virtual configuration data acquiring unit 360, the address held by the actual configuration data holding unit 301 is used. Specifically, referring to FIG. 7A, a setting value identifier 702 accesses "http://canon.com/config", that is set as a value 703 of "device_settings.cloud_address".

Note that the value 703 of "device_settings. cloud_address" is a common address for calling the function of the management service 350 by the image forming apparatus 101. Upon access, a parameter indicating a call for receiving virtual configuration data is given. If functions besides those of the virtual configuration data receiving unit 303 are called, a necessary parameter is similarly given. In addition, for example, a different address may be given for each function to be provided.

A configuration data collecting unit 304 collects actual device configuration data of the image forming apparatus 101. Here, examples of the actual device configuration data are shown in FIGS. 6A to 6C. Values 603 are respectively stored to data types 602. The data type 602 is, for example, a model code for identifying the model, a firmware version, a device identifier for identifying a device, the presence/absence of a facsimile unit, and the like.

Referring back to FIG. 3, the tenant identifier holding unit 305 stores a tenant identifier to which the image forming apparatus 101 belongs. The tenant identifier is set upon initial installation of the image forming apparatus 101 and is stored in the auxiliary storage device 214 so as not to be lost even if the power is OFF. A configuration data notifying unit 306 notifies at the same time actual device configuration data that is collected by the configuration data collecting unit 304 and tenant identifier stored by the tenant identifier holding unit 305. The notification destination is a configuration data receiving unit 358 described below.

An actual configuration data updating unit 307 receives a request from an import processing unit 311 and an actual configuration data setting unit 309 described below and updates the actual configuration data held by the actual configuration data holding unit 301. At the same time, the updated configuration data that is recorded in a difference holding unit 308 described below as a difference. The difference holding unit 308 holds the configuration data updated by the actual configuration data updating unit 307 in the auxiliary storage device 214.

Here, an example of configuration data held by the difference holding unit 308 is shown in FIG. 9. A setting value identifier 902 is an identifier for specifying a changed setting value. A value 903 indicates a changed value. Only the changed value is held in the difference holding unit 308. The actual configuration data setting unit 309 receives a setting change request of the configuration data from a user of the input device 216, and requests the update of the actual configuration data to the actual configuration data updating unit 307. The difference notifying unit 310 notifies a tenant configuration data receiving unit 364 described below of a difference of configuration data recorded in the holding unit 308.

The import processing unit 311 reads import data that is combined from multiple configuration data from the USB host interface 220, and the like, and requests the update of actual configuration data to the actual configuration data updating unit 307. At the same time, an estimated completion time for the import is calculated from the size or content of the import data, and recorded in an import status holding unit 312 described below with an import status. The import status holding unit 312 holds the estimated completion time for the import and the status thereof in the auxiliary storage device 214. Note that information that is held by the import status holding unit 312 may be information of other device(s) received by an import status receiving unit 316 described below, in addition to information of own device.

Here, an example of the import status held by an import status holding unit 365 described below is shown in FIG. 10. A tenant identifier 1002 is an identifier for specifying a tenant shown by status. An importing flag 1003 is a flag for indicating whether or not any one of the image forming apparatuses managed at the tenant is importing. An import device identifier 1004 is an identifier for specifying the image forming apparatus to which an import processing is being performed. An import completion estimated time 1005 represents an import completion estimated time.

In FIG. 10, while information of a plurality of tenants is held for information held by the import status holding unit 365 of the management service 350, what is held by the import status holding unit 312 of the image forming apparatus 101 is only the tenant information belonging to the device itself.

Referring back to FIG. 3, an estimated time displaying unit 313 displays the import completion estimated time held by the import status holding unit 312 on the display 215 and notifies a user of the estimated completion time. An import status notifying unit 314 notifies an import status receiving unit 366 described below of import information of own device held by the import status holding unit 312.

A status confirming unit 315 calls a status confirming receiving unit 363 described below and confirms an information status managed by the management service at regular intervals. In the present embodiment, there are two information statuses managed by the management service, which are the import status and the presence/absence of update of the virtual configuration data, but other statuses may be used. The status confirming unit 315 transfers the received import status to the import status receiving unit 316, and requests virtual configuration data receiving unit 303 to receive virtual configuration data if the virtual configuration data is updated. The interval that the status confirming unit 315 calls the status confirming receiving unit 363 is held by the actual configuration data holding unit 301. Specifically, using FIG. 7A as an example, a setting value identifier 702 calls a status confirming receiving unit 363 at "5 minute" intervals, which is the value 703 of "device_settings.cloud_interval".

The import status receiving unit 316 receives the import status received by the status confirming unit 315 and updates the import status held by the import status holding unit 312. An attribute holding unit 317 holds an attribute of the actual configuration data held by the actual configuration data holding unit 301 in the auxiliary storage device 214. The only attribute that is needed in the present embodiment is an attribute of whether or not the actual configuration data is "read-only", and therefore the details are not shown in the drawings.

Next, a software configuration of the management service 350 will be described. The management service 350 is a management server for providing functions for managing each of the setting values (configuration data) of a plurality of image forming apparatuses 101A to 101C at collective management. This management service 350 is provided on the aforementioned server computer group 105 and holds a plurality of configuration components. In addition, a plurality of setting values to be set in the plurality of image forming apparatuses is managed as master data. Hereinafter, each configuration component will be described below. First, a virtual device holding unit 351 stores data held by the virtual device.

Here, an example of a virtual device stored in the virtual device holding unit 351 is shown in FIG. 8. A virtual device list is the all of the virtual devices held by the virtual device holding unit 351. A device identifier 802 is an identifier for specifying one of a plurality of virtual devices in the virtual device list. The device identifier 802 is an identifier that is originally stored in the image forming apparatus 101 and that enables uniquely identifying the image forming apparatus 101. It is notified from the image forming apparatus 101 as one of the device configuration data.

A tenant identifier 803 is an identifier for specifying a tenant to which the image forming apparatus 101 that corresponds to the virtual device belongs. Virtual device configuration data 804 is device configuration data of the image forming apparatus 101 which corresponds to the virtual device. Concerning the virtual device configuration data 804, information shown in FIGS. 6A to 6C is separately held by the virtual device holding unit 351. The identifiers referenced in FIGS. 6A to 6C are held in the virtual device configuration data 804.

Figure 7A:
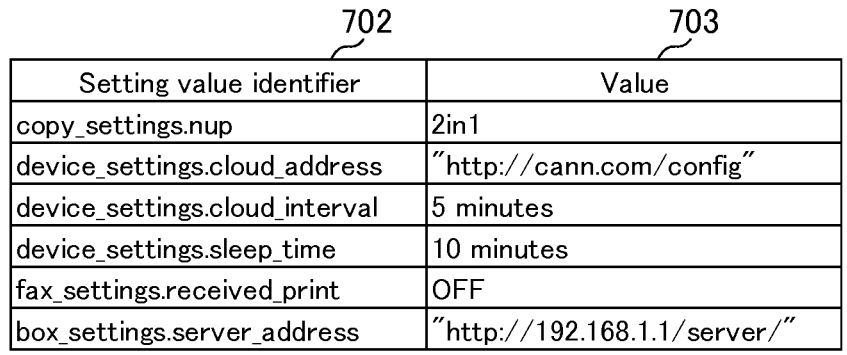
FIGS. 7A to 7C are diagrams respectively illustrating a configuration of an actual configuration data holding unit.
Figure 7B:
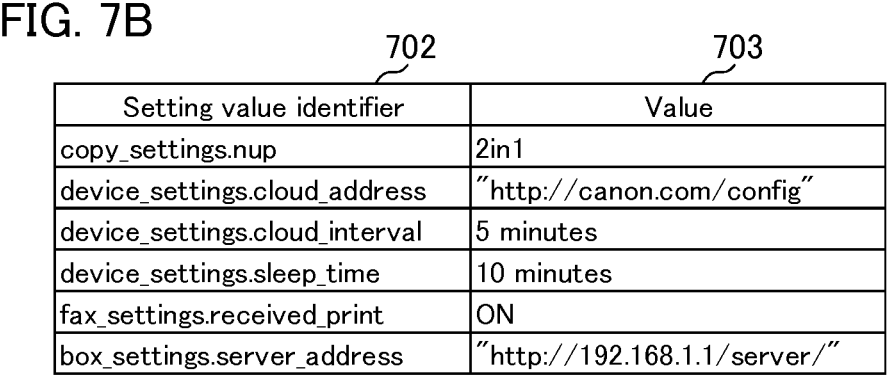
Figure 7C:
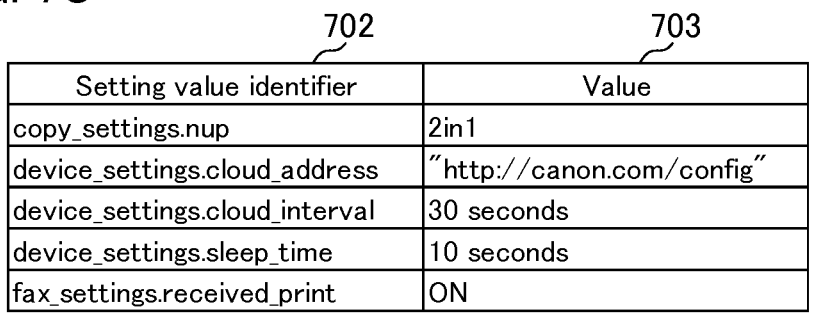

Virtual configuration data 805 is configuration data to be referred to by the image forming apparatus 101 corresponding to the virtual device. Concerning the virtual configuration data, information shown in FIGS. 7A to 7C is separately held by the virtual device holding unit 351. The identifiers referenced in FIGS. 7A to 7C are held in the virtual configuration data 805.

A notification flag 806 is a flag that indicates whether or not a notification has performed to the image forming apparatus 101 after the update of the virtual configuration data. It becomes "notified" if the corresponding virtual configuration data has been referred to by the virtual configuration data acquiring unit 360. In addition, it becomes "not-notified" if the corresponding virtual configuration data has been updated by the virtual configuration data updating unit 357.

An import flag 807 is a flag that indicates whether a notification of the virtual configuration data that has updated by the import to the image forming apparatus 101 has been performed after the completion of the import. If the corresponding virtual configuration data is referred to by the virtual configuration data acquiring unit 360 after importing, it becomes "notified". In addition, it becomes "not-notified" if import is started by the import status updating unit 367.

A schema holding unit 352 stores a model-specific setting value schema. One model-specific setting value schema is prepared corresponding to each model of the image forming apparatuses 101. Here, FIGS. 4A and 4B are diagrams illustrating an exemplary model-specific setting value schema. FIG. 4A is an exemplary model-specific setting value schema corresponding to the model code of 0x01. In addition, FIG. 4B is an exemplary model-specific setting value schema corresponding to the model code of 0x02.

A setting value identifier 402 is an identifier for uniquely identifying the setting values. Here, "copy_settings.nup" indicates a setting item relating to imposition in copy settings. If the setting value identifiers 402 are identical, it indicates that the setting values are of the same type even if the models are different. A default value 403 is a definition of a default setting value for the model.

A value range 404 is a definition of a range which can be set in the model. The value range 404 of the setting value identifier "copy_settings.nup" indicates that the value range can be selected from three types of "1 in 1, 2 in 1, and 4 in 1". A condition 405 is a definition of the conditions necessary for utilizing setting values in the model. In condition 405 of "fax_settings.received_print", there is "facsimile unit", thus, this indicates that this is a valid setting value only if mounting of a facsimile unit is confirmed.

Referring back to FIG. 3, a schema updating unit 353 updates the model-specific setting value schema held by a schema holding unit 352. If a vendor of image forming apparatuses announces a new model, a model-specific setting value schema corresponding to the new model is registered in accordance with the instruction given by the administrator of the vendor. If any setting value is changed, the model-specific setting value schema is updated in the same way.

A tenant configuration data holding unit 354 holds configuration data of which the tenant hopes to set in the image forming apparatus 101. Here, FIG. 5 illustrates an example of tenant configuration data. A setting value identifier 502 is identical to the setting value identifier 402 included in the model-specific setting value schema shown in FIGS. 4A and 4B. A value 503 is a common setting value desired by the tenant. "2 in 1" is set in "copy_settings.nup". This indicates that it is desired to set "2 in 1" in all of the image forming apparatuses held by a tenant.

A tenant configuration data updating unit 355 updates tenant configuration data held by the tenant configuration data holding unit 354. A service person who manages the image forming apparatuses held by the tenant or a manager of the image forming apparatus may update the tenant configuration data. The update instruction by the service person is performed on a setting screen that is displayed on a web browser running on the terminal device 102B in the service person environment 110. The update instruction by the manager of the image forming apparatus is first performed at the input device 216 of the image forming apparatus, and then performed by calling a tenant configuration data receiving unit 364 described below by the difference notifying unit 310.

A virtual configuration data generating unit 356 generates virtual configuration data using the model-specific setting value schema, tenant configuration data, and virtual device configuration data. The processing contents will be described step by step. First, the virtual configuration data generating unit 356 acquires virtual device configuration data from the virtual device holding unit 351. Here, referring to the model code included in the acquired virtual device configuration data, the model of the image forming apparatus is specified. Using FIG. 6A as an example, the model code determines 0x01 as the model.

Next, a model-specific setting value schema matching with the acquired model code is acquired from the schema holding unit 352. Using FIG. 6A as an example, FIG. 4A where the model code matches 0x01 is acquired. Next, the setting values defined in the model-specific setting value schema are taken as a basis of the virtual configuration data.

Using FIG. 4A as an example, the following 6 setting values are taken as the basis. That is, "copy_settings.nup", "device_settings.cloud_address", "device_settings.cloud_interval", "device_settings.sleep_time", "fax_settings.received_print", and "box_settings.server_address" are taken as the basis.

Next, the virtual configuration data generating unit 356 acquires the value registered in the tenant configuration data and determines whether or not the setting value included in tenant configuration data falls within the value range defined in the model-specific setting value schema. Using FIG. 4A and FIG. 5 as examples, "copy_settings.nup" is "2 in 1", and the value range is "1 in 1, 2 in 1, and 4 in 1", and therefore the value falls within the value range. However, "device_settings.sleep_time" is "10 seconds", and the value range is "1 minute, 10 minutes, and 1 hour", and therefore the value does not fall within the value range. If not within the value range, the default value defined in the model-specific setting value schema is acquired. In the present embodiment, it becomes "10 minutes".

Next, it is determined whether or not the condition defined in the model-specific setting value schema is satisfied. The determination is performed using device configuration data. Using FIG. 4A as an example, there is no particular condition corresponding to "copy_settings.nup", and therefore the condition "copy_settings.nup" is satisfied. However, the condition corresponding to "fax_settings.received_print" is "facsimile unit", whereas the device configuration data is "none", thus, the condition is not satisfied. Here, if the condition is satisfied, the value determined in the past steps is used. In contrast, if the condition is not satisfied, the default value 403 defined in the model-specific setting value schema is acquired. In the present embodiment, it becomes "OFF".

The value determined in the above steps is the virtual configuration data. An example of virtual configuration data is shown in FIGS. 7A to 7C. FIG. 7A is virtual configuration data for the image forming apparatus of which the device identifier is 010001. In addition, FIG. 7B is virtual configuration data for the image forming apparatus of which the device identifier is 010002. Further, FIG. 7C is virtual configuration data for the image forming apparatus of which the device identifier is 020001.

A virtual configuration data updating unit 357 registers virtual configuration data generated at the virtual configuration data generating unit 356 in the virtual device holding unit 351. A virtual device with which the device identifier matches is searched among the virtual devices held by the virtual device holding unit 351 and the virtual configuration data is updated. In addition, if the notification flag 806 of the virtual device is "notified", it is set to "not-notified". This indicates that the virtual configuration data is changed and that the image forming apparatus needs to refer to the new virtual configuration data.

A configuration data receiving unit 358 receives a notification from the configuration data notifying unit 306. The notified information is the device configuration data and the tenant identifier shown in FIGS. 6A to 6C. A configuration data updating unit 359 registers device configuration data received at the configuration data receiving unit 358 in the relevant virtual device as virtual device configuration data. A virtual device with which the device identifier matches is searched among the virtual devices held by the virtual device holding unit 351, and the virtual device configuration data is updated.

A virtual configuration data acquiring unit 360 accepts a request from the image forming apparatus 101 through the Internet 104 and acquires virtual configuration data. The request includes a device identifier for specifying at least a virtual device and a virtual device with which the device identifier matches is searched for. The virtual configuration data held by the searched virtual device is searched, and the virtual configuration data is passed to the request source.

A virtual configuration data viewing unit 361 is a unit that receives a request through the Internet 104 and views virtual configuration data. The request is, for example, a request on an HTTP protocol and viewing of the virtual configuration data is performed on an HTML page generated by the virtual configuration data viewing unit 361.

An update confirming unit 362 confirms whether or not the virtual configuration data is updated. The update confirming unit 362 receives the device identifier of the image forming apparatus to be confirmed from a status confirmation receiving unit 363 described below. The update confirming unit 362 searches the virtual device matching with the received device identifier among the virtual devices held by the virtual device holding unit 351. If the notification flag 806 of the searched virtual device indicates "not-notified", it is determined that the virtual configuration data has updated. On the contrary, if the notification flag 806 indicates "notified", it is determined that the virtual configuration data has not updated.

A status confirmation receiving unit 363 receives a request from the status confirming unit 315 and confirms the information status managed by a management service. The status confirmation receiving unit 363 calls an import status acquiring unit 368 for acquiring the import status and calls the update confirming unit 362 for acquiring the presence/absence of the update of the virtual configuration data. A device identifier for specifying the image forming apparatus is included in the requests from the status confirming unit 315, and the status confirmation receiving unit 363 passes the device identifier to the import status acquiring unit 368 and the update confirming unit 362. The status confirmation receiving unit 363 collects the result of the import status acquiring unit 368 and the update confirming unit 362 and responds to the status confirming unit 315.

A tenant configuration data receiving unit 364 receives configuration data changed at the image forming apparatus 101 from the difference notifying unit 310 and requests the update of the tenant configuration data to the tenant configuration data updating unit 355. The import status holding unit 365 holds a tenant import status shown in FIG. 10 in the auxiliary storage device 254. An import status receiving unit 366 receives a notification about the import status from the import status notifying unit 314, and requests the update of the import status to the import status updating unit 367.

The import status updating unit 367 updates the import status held by the import status holding unit 365. An import status acquiring unit 368 receives the device identifier from the status confirmation receiving unit 363 and acquires a tenant import status to which the image forming apparatus shown by the device identifier belongs, from the import status holding unit 365. Specifically, a tenant identifier corresponding to the device identifier is acquired from the virtual device holding unit 351, and the corresponding tenant import status is acquired from the import status holding unit 365.

Figure 11:
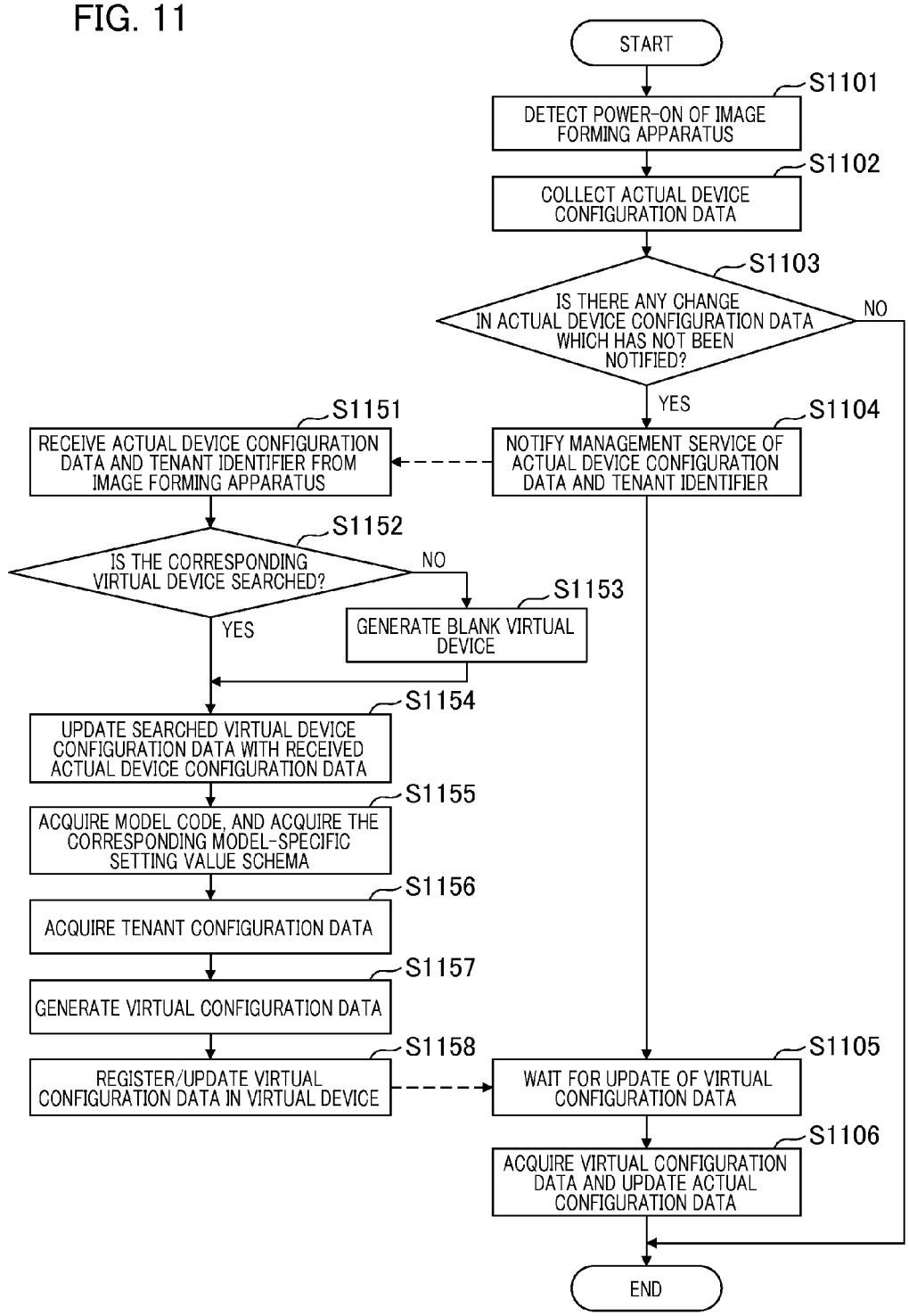
FIG. 11 is a flowchart illustrating an updating processing of an actual device configuration.

Next, FIG. 11 is a flowchart for explaining a processing of acquiring virtual configuration data if the image forming apparatus is initially installed and the device configuration is changed. Step S1101 to step S1106 are processing performed in the image forming apparatus. Each unit that executes those processing is stored in any one of the storage units, which are the non-volatile memory 212, the volatile memory 213, and the auxiliary storage device 214, and executed by the CPU 211. Step S1151 to step S1158 are processing performed in the server computer group 105. Each unit that executes those processinges is stored in any one of the storage units, which are the non-volatile memory 252, the volatile memory 253, and the auxiliary storage device 254, and executed by the CPU 251.

First, in the step S1101, the configuration data notifying unit 306 detects the power ON of the image forming apparatus 101. Next, in step S1102, the configuration data collecting unit 304 collects the device configuration data. Next, in step S1103, the configuration data notifying unit 306 determines whether or not there is any change in actual device configuration data that has not been notified to the management service 350, using the actual device configuration data collected in the step S1102. If there is any change (YES), the processing proceeds to step S1104. If there is no change (NO), the processing ends. In the step S1104, the configuration data notifying unit 306 notifies the management service 350 of the actual device configuration data and the tenant identifier. At the management service 350 side, the above is detected in step S1151 and the processing is performed. The details will be described below.

In step S1105, the virtual configuration data receiving unit 303 waits for the execution of the processing until the update of virtual configuration data is completed. Next, in step S1106, the virtual configuration data receiving unit 303 receives virtual configuration data from the management service 350. In addition, the virtual configuration data application unit 302 updates the received virtual configuration data as actual configuration data. The actual configuration data is stored by the actual configuration data holding unit 301.

On the other hand, the actual device configuration data and the tenant identifier are notified to the management service 350 in step S1104, and the configuration data receiving unit 358 receives the actual device configuration data and tenant identifier notified from the image forming apparatus in step S1151. Next, in step S1152, the configuration data updating unit 359 searches for a virtual device matching with the actual device configuration data and the tenant identifier received in the step S1151. In the present embodiment, the search is performed among the virtual devices held by the virtual device holding unit 351. If the image forming apparatus has communicated with the management service 350 for the first time, there may be cases where the virtual device cannot be searched. If the matching virtual device is searched (YES), the processing proceeds to step S1154. If the matching virtual device is not searched (NO), the processing proceeds to step S1153.

Next, in the step S1153, the configuration data updating unit 359 generates a blank virtual device. In the step S1154, the configuration data updating unit 359 updates virtual device configuration data of the virtual device that is searched in the step S1152 or generated in the step S1153. Note that the contents of the actual device configuration data received in the step S1151 becomes the new virtual device configuration data.

Next, in step S1155, the virtual configuration data generating unit 356 acquires a model code from the updated virtual device configuration data. In addition, a model-specific setting value schema corresponding to the model code is acquired from the schema holding unit 352. In step S1156, the virtual configuration data generating unit 356 acquires tenant configuration data. For the tenant configuration data, one with which the tenant identifier matches is searched for among from the tenant configuration data held by the tenant configuration data holding unit 354.

Next, in step S1157, the virtual configuration data generating unit 356 generates virtual configuration data. The virtual configuration data is generated using virtual device configuration data, model-specific setting value schema, and tenant configuration data. Next, in step S1158, the virtual configuration data updating unit 357 registers/updates the virtual configuration data generated in the step S1157 in the corresponding virtual device. Accordingly, virtual configuration data is registered/updated and the processing proceeds to step S1106.

Figure 12:
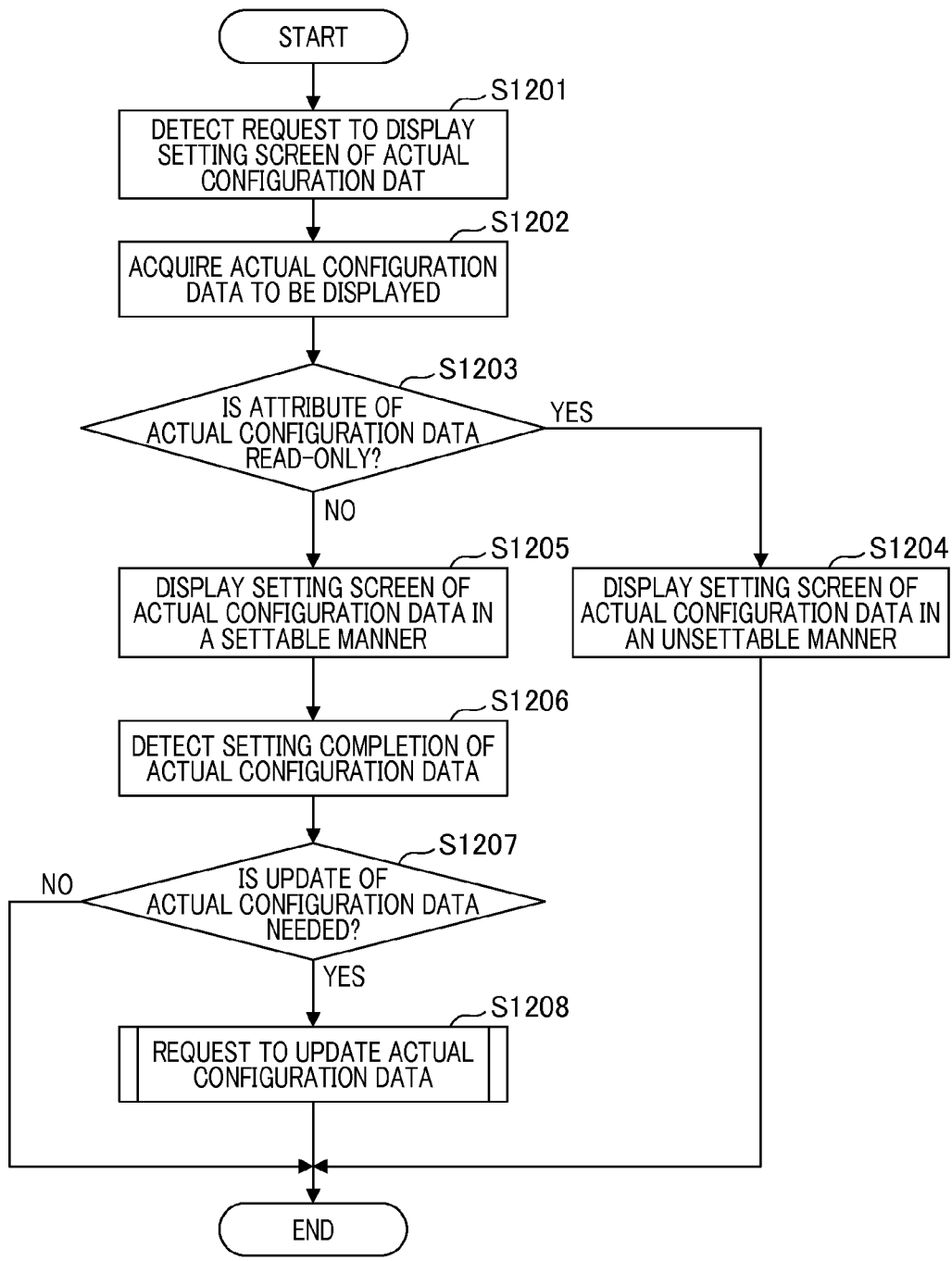
FIG. 12 is a flowchart illustrating an updating processing of configuration data.

Next, FIG. 12 is a flowchart illustrating the processing where a user updates actual configuration data by using the input device 216 of the image forming apparatus. Each unit that executes each processing in the flowchart is stored in any one of the storage units which are the non-volatile memory 212, the volatile memory 213, and the auxiliary storage device 214, and executed by the CPU 211.

First, in step S1201, the actual configuration data setting unit 309 detects a request to display the setting screen of the actual configuration data that is instructed from the input device 216. Next, in step S1202, the actual configuration data setting unit 309 acquires the actual configuration data for displaying on the setting screen from the actual configuration data holding unit 301. Then, in step S1203, the actual configuration data setting unit 309 confirms the read-only attribute held by the attribute holding unit 317, and the processing proceeds to step S1204 if the attribute of the actual configuration data is read-only (YES). On the other hand, the processing proceeds to step S1205 if the attribute of the actual configuration data is not read-only (NO).

In step S1204, the actual configuration data setting unit 309 displays the setting screen of the actual configuration data on the display 215 in an unsettable manner (for example, a button for setting change is shaded, or the like) and the processing ends. In contrast, in step S1205, the actual configuration data setting unit 309 displays the setting screen of the actual configuration data on the display 215 in a settable manner. Next, in step S1206, the actual configuration data setting unit 309 detects the setting completion by a user, for example, a user closes the setting screen of configuration data. At this timing, the value that is input by the user through the setting screen of actual configuration data has merely held by the volatile memory 213, and has not been applied in the actual configuration data holding unit 301 yet.

Next, in step S1207, the actual configuration data setting unit 309 compares the value held by the actual configuration data holding unit 301 with the value held by the volatile memory 213, and confirms whether or not the value of configuration data is updated by the user. In other words, it is determined whether or not the update of actual configuration data is needed. If the update is required (YES), the processing proceeds to step S1208, and if the update is not needed (NO), the processing ends. Then, in the step S1208, the actual configuration data setting unit 309 requests the update of the actual configuration data to the actual configuration data updating unit 307. The details about the update of the actual configuration data by the actual configuration data updating unit 307 will be described in FIG. 14.

Figure 13:
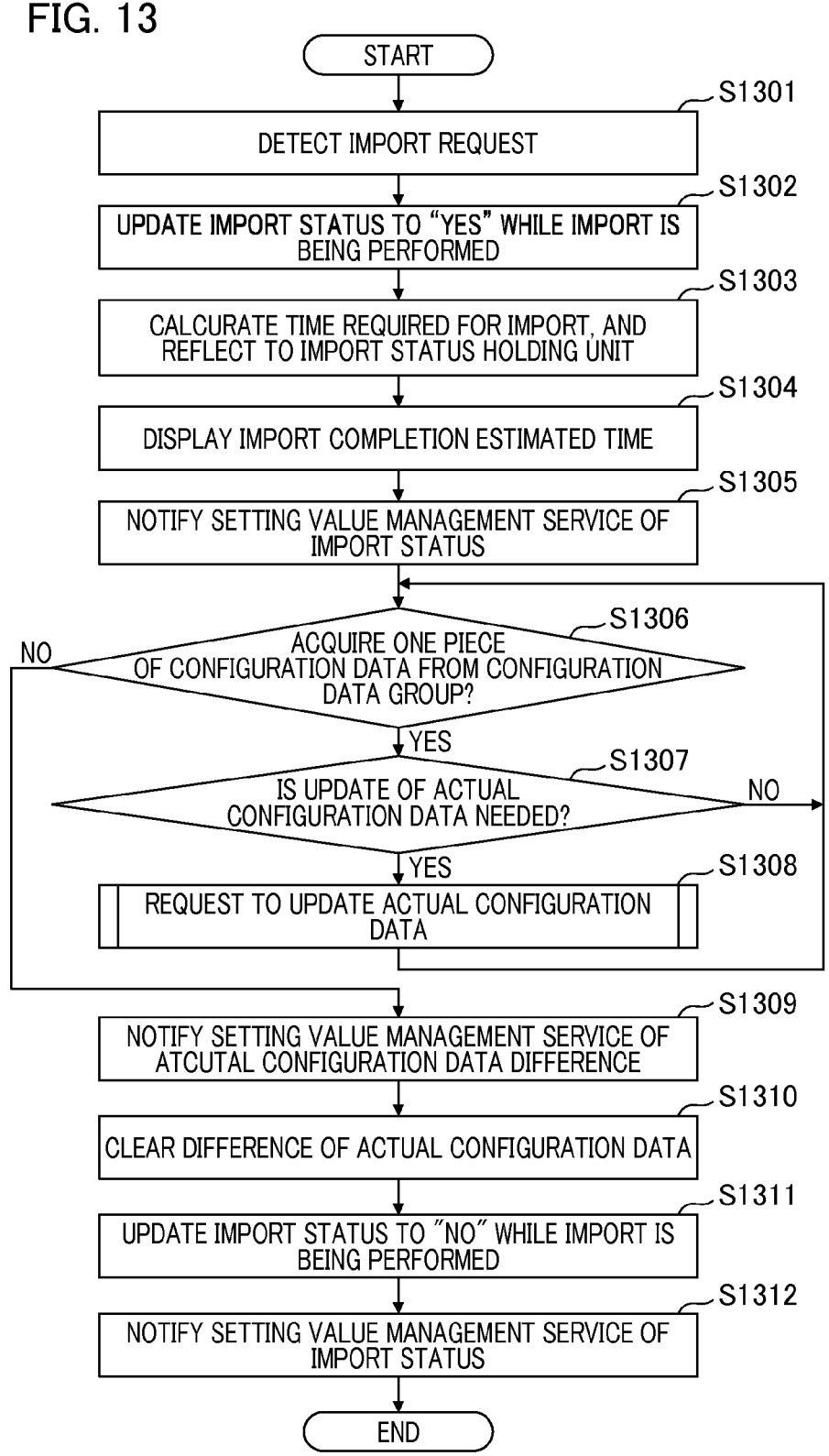
FIG. 13 is a flowchart illustrating an import processing.

Next, FIG. 13 is a flowchart illustrating an import processing of the image forming apparatus. Each unit that executes each processing in the flowchart is stored in any one of the storage units, which are the non-volatile memory 212, the volatile memory 213, and the auxiliary storage device 214, and executed by the CPU 211.

First, in step S1301, the import processing unit 311 detects a configuration data group import request that is recorded in a USB memory connected to the USB host interface 220. The configuration data group is not limited to the USB memory, and may be located in a different device that is accessible via the network communication device 217. Next, in step S1302, the import processing unit 311 updates an importing flag 1003 of the import status holding unit 312 to "YES" that indicates that the import is being performed. At the same time, tenant identifier of own device is recorded in a tenant identifier 1002, and an import device identifier of own device is recorded in an import device identifier 1004.

Next, in step S1303, the import processing unit 311 calculates a time required for the import processing from a file size and contents of the configuration data group, and updates an import completion estimated time 1005 of the import status holding unit 312. Next, in step S1304, the estimated time displaying unit 313 displays the value of the import completion estimated time 1005 of the import status holding unit 312 on the display 215. Then, in step S1305, the import status notifying unit 314 notifies the import status receiving unit 366 of the import information of own device held by the import status holding unit 312. Note that the processing of the management service 350 side which has received the import status will be described in FIG. 15.

Next, in step S1306, the import processing unit 311 acquires one piece of configuration data in order to sequentially perform processing for the configuration data recorded in the configuration data group. After the configuration data is acquired, the processing proceeds to step S1307. The processing is sequentially performed for all the configuration data, and if the subsequent configuration data cannot be acquired, the processing proceeds to step S1309.

In the step S1307, the import processing unit 311 compares the value held by the actual configuration data holding unit 301 with the value acquired in the step S1306, and determines whether or not the update of the actual configuration data is needed. If the update is required (YES), the processing proceeds to the step S1308, and if the update is not required (NO), the processing is returned to the step S1306 in order to acquire the subsequent configuration data. Then, in the step S1308, the import processing unit 311 requests the update of the actual configuration data to the actual configuration data updating unit 307. The details of the update of the actual configuration data by the actual configuration data updating unit 307 will be described in FIG. 14. If the execution in the step S1308 ends, the import processing unit 311 returns to the step S1306 in order to acquire the subsequent configuration data.

If the processing for all the configuration data ends, the difference notifying unit 310 notifies the tenant configuration data receiving unit 364 of the difference of configuration data (setting value after the import processing) recorded in the difference holding unit 308, in the step S1309. Note that the processing of the management service 350 side which has received the difference of the configuration data will be described in FIGS. 16 and 17.

Next, in step S1310, the difference notifying unit 310 deletes all the differences of configuration data recorded in the difference holding unit 308. Next, in step S1311, the import processing unit 311 updates the importing flag 1003 of the import status holding unit 312 to "NO". Then, in step S1312, the import status notifying unit 314 notifies the import status receiving unit 366 of the import information of own device held by the import status holding unit 312.

Figure 14:
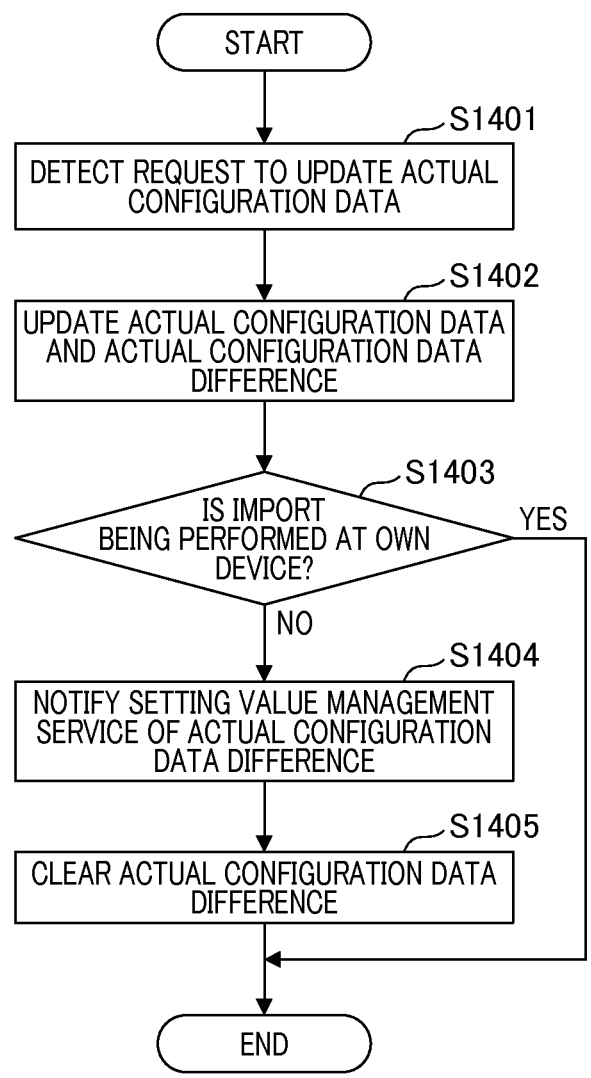
FIG. 14 is a flowchart illustrating an updating processing of actual configuration data.

Next, FIG. 14 is a flowchart for explaining the updating process of the actual configuration data accompanying the setting change of the configuration data performed in the image forming apparatus. Each unit that executes each process in the flowchart is stored in any one of the storage units which are the non-volatile memory 212, the volatile memory 213, the auxiliary storage device 214, and executed by the CPU 211.

First, in step S1401, the actual configuration data updating unit 307 detects an actual configuration data updating request. Note that the actual configuration data updating request is performed in the step S1208 in FIG. 12 and in the step S1308 in FIG. 13. Next, in step S1402, the actual configuration data updating unit 307 records the configuration data to be updated in the actual configuration data holding unit 301 and the difference holding unit 308.

Next, in step S1403, the difference notifying unit 310 views the import device identifier 1004 and the importing flag 1003 of the import status holding unit 312 and confirms whether or not the import processing is being processed at own device. If the import processing is being processed at own device (YES), the processing ends. Accordingly, the change of the setting value until the completion of the import processing is limited. In contrast, if the import processing is not being performed at own device (NO), the processing proceeds to step S1404.

Then, in step S1404, the difference notifying unit 310 notifies the tenant configuration data receiving unit 364 of the difference of the configuration data recorded in the difference holding unit 308. In step S1405, the difference notifying unit 310 deletes all the differences of the configuration data recorded in the difference holding unit 308.

Figure 15:
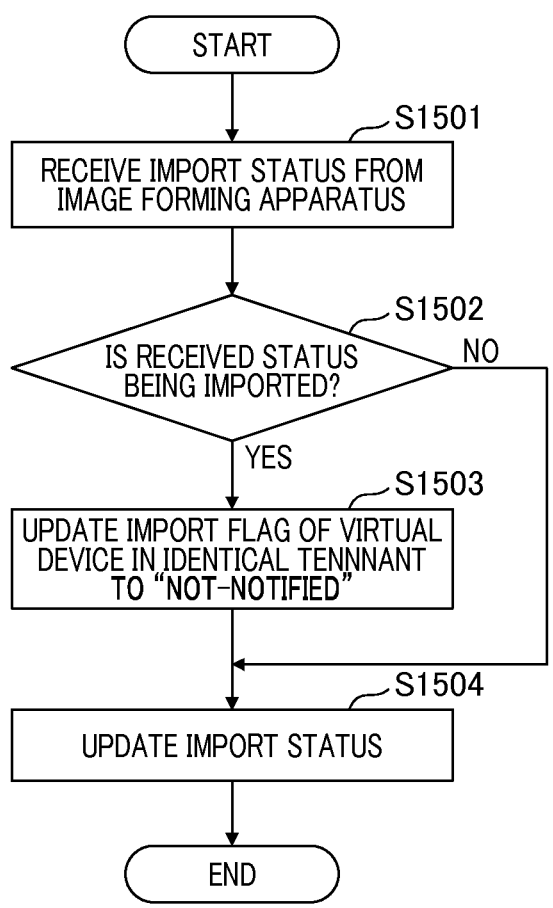
FIG. 15 is a flowchart illustrating an updating processing of an import status.

Next, FIG. 15 is a flowchart for processing the import status notified from the image forming apparatus by the management service 350. Each unit that executes each processing in the flowchart is stored in any one of the storage units which are the non-volatile memory 252, the volatile memory 253, the auxiliary storage device 254, and executed by the CPU 251.

First, in step S1501, the import status receiving unit 366 receives an import status of the image forming apparatus from the import status notifying unit 314. Next, in step S1502, the import status receiving unit 366 views the importing flag of the received import status, and confirms whether or not the import processing is being performed. If the import processing is being performed (YES), the processing proceeds to step S1503, and if the import processing is not being performed (NO), the processing proceeds to step S1504.

Then, in the step S1503, the import status updating unit 367 updates an import flag 807 of the virtual device holding unit 351 having a tenant identifier that is identical to the tenant identifier of the received import status to "NO". Next, in the step S1504, the import status updating unit 367 applies (updates) the received import status in the import status holding unit 365.

Figure 16:
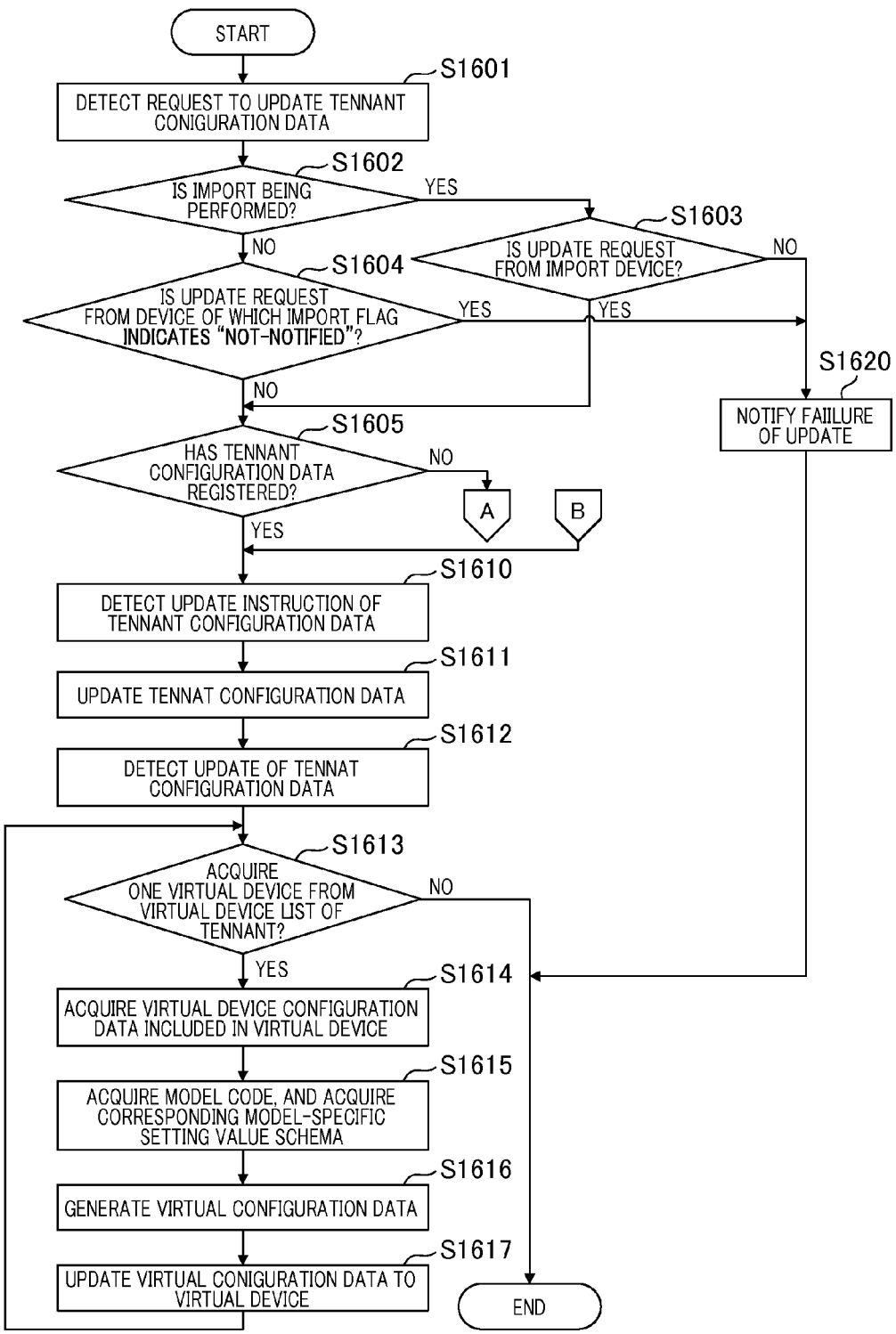
FIG. 16 is a flowchart illustrating an updating processing of the tenant configuration data.
Figure 17:
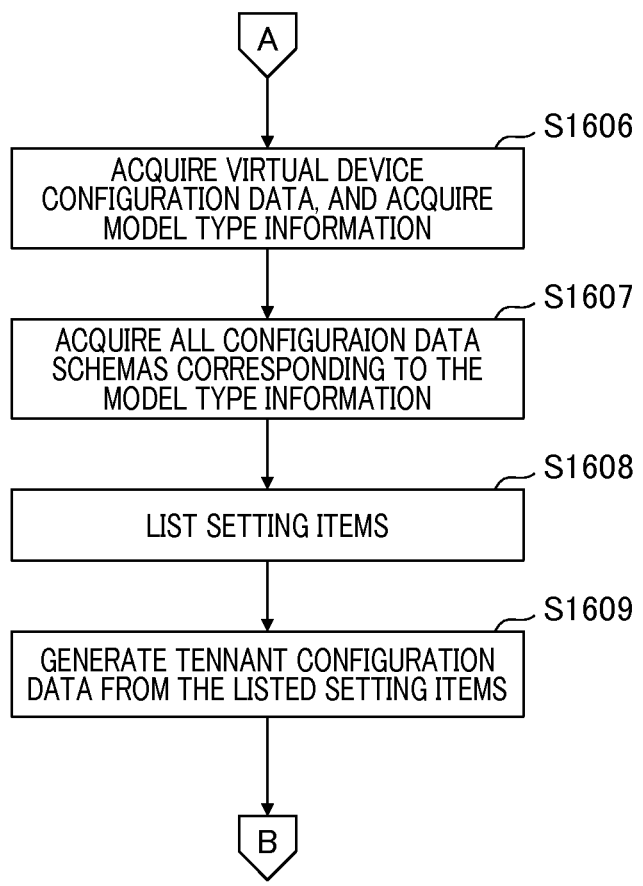
FIG. 17 is a flowchart illustrating an updating processing of the tenant configuration data.

Next, FIGS. 16 and 17 are flowcharts illustrating the processing where the management service 350 receives the tenant configuration data updating request and updates the tenant configuration data. The tenant configuration data updating request is requested from a manager user using the terminal device 102A, or requested from the difference notifying unit 310 after changing the setting in the image forming apparatus 101. Each unit that executes each processing in the flowchart is stored in any one of the storage units which are the non-volatile memory 252, the volatile memory 253, the auxiliary storage device 254, and executed by the CPU 251.

First, in step S1601, the tenant configuration data receiving unit 364 detects the tenant configuration data updating request. Next, in step S1602, the tenant configuration data updating unit 355 refers to the tenant identifier 1002 and the importing flag 1003 of the import status holding unit 365, and confirms whether or not the tenant to be updated is performing an import. If the tenant to be updated is performing an import (YES), the processing proceeds to step S1603, and if the tenant to be updated is not performing an import (NO), the processing proceeds to step S1604.

Then, in the step S1603, the tenant configuration data updating unit 355 refers to the import device identifier 1004 of the import status holding unit 365, and determines whether or not a transmission source is from the image forming apparatus that performs the import. If the updating request is from the image forming apparatus that performs the import (YES), the processing proceeds to step S1605. In contrast, in step S1620, if the updating request is not from the image forming apparatus that performs the import (NO), the fact that the update is unsuccessful (error) is notified to the request source and the processing ends.

Then, in the step S1604, the tenant configuration data updating unit 355 determines whether or not the updating request is from the image forming apparatus where the import flag 807 of the virtual device holding unit 351 indicates "not-notified". If the updating request is not from the image forming apparatus where the import flag 807 indicates "not-notified" (NO), the processing proceeds to step S1605, and if the updating request is from the image forming apparatus that indicates "not-notified" (YES), the fact that the update is unsuccessful is notified to the request source and the processing ends.

In the step S1605, the tenant configuration data updating unit 355 determines whether or not there is tenant configuration data where the updating request has been performed in the step S1601 in the tenant configuration data holding unit 354. In other words, it is determined whether or not the tenant configuration data is registered. If the tenant configuration data is present (has been already registered) (YES), the processing proceeds to the step S1610. If the tenant configuration data is not present (has not been registered) (NO), the processing proceeds to step S1606.

In the step S1606, the tenant configuration data updating unit 355 searches for the virtual device held by the tenant from the virtual device holding unit 351. Then, virtual device configuration data is acquired from the virtual device. Next, in the step S1607, the tenant configuration data updating unit 355 refers to the model code in the virtual device configuration data of the virtual device that is searched and acquired in the step S1606. In addition, all the model-specific setting value schemas matching with the model code are searched from the schema holding unit 352.

Next, in the step S1608, the tenant configuration data updating unit 355 lists the setting items which are included in at least one of the model-specific setting value schemas which are searched in the step S1607. Then, in the step S1609, the tenant configuration data updating unit 355 generates tenant configuration data having the setting items which are listed in the step S1608. After generating the tenant configuration data, the processing proceeds to step S1610.

Next, in the step S1610, the tenant configuration data updating unit 355 detects a specific update instruction of the tenant configuration data. Next, in step S1611, the tenant configuration data updating unit 355 updates the tenant configuration data held by the tenant configuration data holding unit 354 based on the update instruction detected in the step S1610. Then, in step S1612, the virtual configuration data generating unit 356 detects the update of the tenant configuration data.

Next, in step S1613, the virtual configuration data generating unit 356 searches for the virtual device matching with the tenant identifier of the tenant configuration data that has detected the update from the virtual device held by the virtual device holding unit 351. In the step S1613, one virtual device is acquired in order to sequentially perform the processing for the searched virtual device. Then, after one virtual device is acquired, the processing proceeds to step S1614. The processing are sequentially performed for all the virtual devices, and if the subsequent virtual device cannot be acquired (NO), the processing ends.

Then, in the step S1614, the virtual configuration data generating unit 356 acquires the virtual device configuration data from the virtual device. Next, in step S1615, the virtual configuration data generating unit 356 acquires the model code from the virtual device configuration data. In addition, a model-specific setting value schema that corresponds to the model code is searched from the model-specific setting value schema held by the schema holding unit 352.

Next, in step S1616, the virtual configuration data generating unit 356 generates virtual configuration data using the virtual device configuration data, the model-specific setting value schema, and the tenant configuration data. Then, in step S1617, the virtual configuration data updating unit 357 registers the virtual configuration data generated in the step S1616 in the virtual device.

Figure 19A:
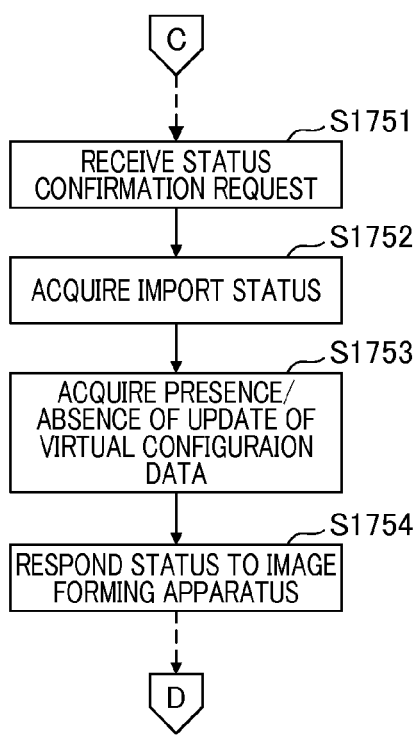
FIGS. 19A and 19B are flowcharts illustrating the status confirming processing.
Figure 19B:
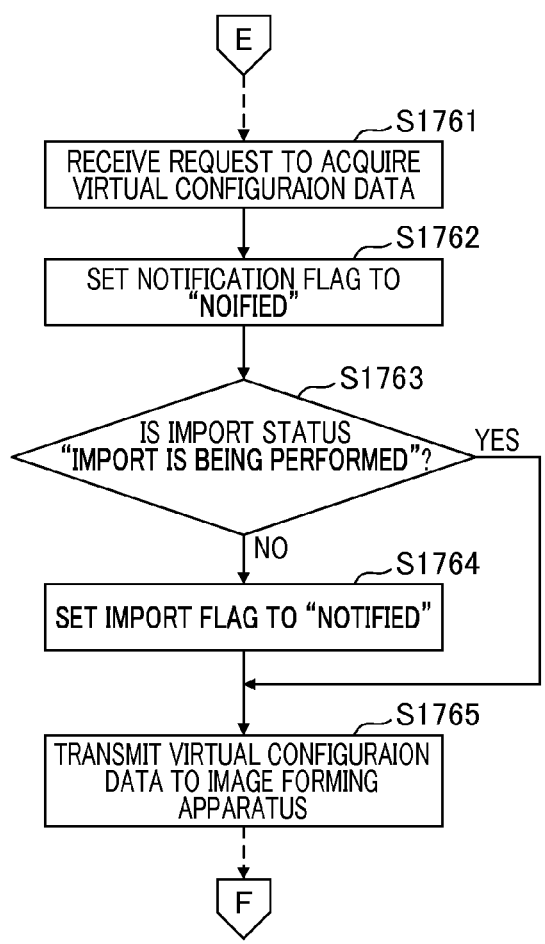

Next, FIGS. 18 to 19B are flowcharts illustrating the processing where the image forming apparatus regularly inquires the status of the information that is managed by the management service 350 at regular intervals. Step S1701 to step S1717 are processing which are performed in the image forming apparatus. Each unit that executes each processing in the flowchart is stored in any one of the storage units which are the non-volatile memory 212, the volatile memory 213, the auxiliary storage device 214, and executed by the CPU 211. In addition, steps S1751 to S1754, and steps S1761 to S1765 are processing performed in the server computer group 105. Each unit that executes each processing in the flowchart is stored in any one of the storage units which are the non-volatile memory 252, the volatile memory 253, the auxiliary storage device 254, and executed by the CPU 251.

First, in step S1701, the status confirming unit 315 refers to the importing flag 1003 of the import status holding unit 312 and determines whether or not the import processing is being performed. If the import processing is being performed (YES), the processing proceeds to step S1702, and if the import processing is not being performed (NO), the processing proceeds to step S1705. Then, in the step S1702, the status confirming unit 315 refers to the import device identifier 1004 of the import status holding unit 312, and determines whether or not the import processing is performed by own device. If the import processing is performed by own device (YES), the completion of the import processing is awaited in step S1703. In contrast, if the import processing is not performed by own device (NO), the processing proceeds to step S1704.

Then, in the step S1704, the status confirming unit 315 determines whether or not a current time exceeds the import completion estimated time 1005 of the import status holding unit 312. If the current time exceeds the import completion estimated time 1005 (YES), the processing proceeds to step S1706, and if current time does not exceed the import completion estimated time 1005 (NO), the processing proceeds to step S1705.

In the step S1705, the status confirming unit 315 determines whether or not a predetermined time has passed since the past status confirmation to the management service 350. Note that, in the present embodiment, the predetermined time is held by the actual configuration data holding unit 301. Specifically, using FIG. 7A as an example, a setting value identifier 702 is "5 minutes" that is the value 703 of "device_settings.cloud_interval". If the predetermined time has passed (YES), the processing proceeds to step S1706, and if the predetermined time has not passed (NO), the processing is returned to the step S1701.

Then, in the step S1706, the status confirming unit 315 requests the management service 350 of the status confirmation. At the management service 350 side, the status confirmation receiving unit 363 receives the request in step S1751. Next, in step S1752, the status confirmation receiving unit 363 calls the import status acquiring unit 368, and acquires the import status held by the import status holding unit 365.

Next, in step S1753, the status confirmation receiving unit 363 calls the update confirming unit 362, and acquires the presence/absence of the update of the virtual configuration data. Next, in step S1754, the status confirmation receiving unit 363 notifies the image forming apparatus of the import status and the presence/absence of the update of the virtual configuration data, as a response to the status confirming request. At the image forming apparatus 101 side, the status confirming unit 315 that has awaited the response in the step S1707 receives the response.

Then, in step S1708, the import status receiving unit 316 determines whether or not the import status received by the status confirming unit 315 is changed from the import status currently held by the holding unit 312. If the import status is changed (YES), the processing proceeds to step S1709, and if the import status is not changed (NO), the processing proceeds to step S1714.

In the step S1709, the import status receiving unit 316 updates the import status holding unit 312 with the received import status. Then, in step S1710, the import status receiving unit 316 refers to the importing flag 1004 of the import status, and determines whether or not the import processing is being performed. If the import processing is being performed (YES), the processing proceeds to step S1712, and if the import processing is not being performed (NO), the processing proceeds to step S1711. Next, in the step S1711, the import status receiving unit 316 releases the read-only from the actual configuration data attribute held by the attribute holding unit 317, and the processing proceeds to step S1714.

On the other hand, in step S1712, the import status receiving unit 316 sets the actual configuration data attribute held by the attribute holding unit 317 to read-only. Then, in step S1713, the estimated time displaying unit 313 displays the value of the import completion estimated time 1005 of the import status holding unit 312 on the display 215, and the processing proceeds to step S1714.

Then, in step S1714, the status confirming unit 315 confirms whether or not the virtual configuration data received in the step S1707 is updated. If the virtual configuration data is updated (YES), the processing proceeds to step S1715, and if the virtual configuration data is not updated (NO), the processing ends.

Next, in step S1715, the virtual configuration data receiving unit 303 requests the acquisition of the virtual configuration data to the management service 350. Then, at the management service 350 side, the virtual configuration data acquiring unit 360 receives the request in step S1761. Next, in step S1762, the virtual configuration data acquiring unit 360 sets the notification flag 806 of the image forming apparatus that has requested the acquisition of the virtual configuration data to "notified".

Then, in step S1763, the virtual configuration data acquiring unit 360 refers to the importing flag 1003 of the import status holding unit 365, and determines whether or not the import processing is being performed. If the import processing is being performed (YES), the processing proceeds to step S1765, and if the import processing is not being performed (NO), the processing proceeds to step S1764. Next, in the step S1764, the virtual configuration data acquiring unit 360 sets the import flag 807 of the image forming apparatus that has requested the acquisition of the virtual configuration data to "notified".

In the step S1765, the virtual configuration data acquiring unit 360 transmits the virtual configuration data to the image forming apparatus, as a response to the virtual configuration data acquiring request. Then, at the image forming apparatus 101 side, the virtual configuration data receiving unit 303 that has awaited the response receives the response in the step S1716. Next, in step S1717, the virtual configuration data application unit 302 updates (applies) the received virtual configuration data as the actual configuration data. Then, the actual configuration data is stored by the actual configuration data holding unit 301.

As described above, according to the present embodiment, in a system where configuration data for a plurality of image forming apparatuses is synchronized through the server, even if the configuration data group is imported at the image forming apparatus side, the configuration data can be properly applied in other image forming apparatuses. Note that a configuration in which the virtual configuration data is generated by using license data may be used. In this case, the configuration in which the virtual configuration data matching with optional functions provided in the image forming apparatus is generated is used.

Figure 3:
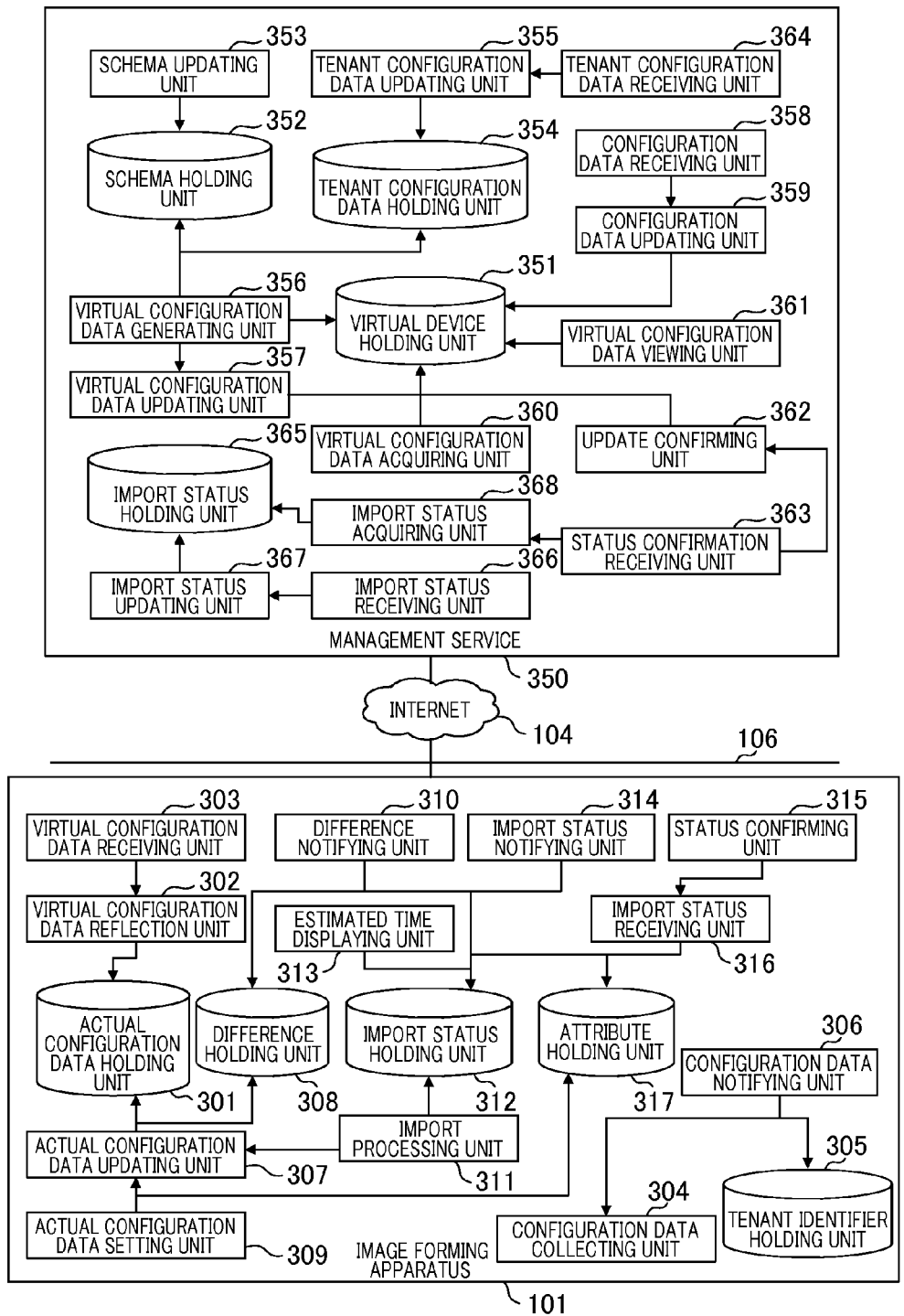
FIG. 3 is a diagram illustrating a software configuration of a management service and the image forming apparatus.

Note that, in the software configuration diagram shown in FIG. 3, the actual configuration data holding unit 301 stores the actual configuration data in the auxiliary storage device 214, however, another configuration may be employed. For example, a configuration of temporarily storing in the volatile memory 213 may be employed. In this case, the virtual configuration data receiving unit 303 needs to receive the virtual configuration data every time the power source of the device is turned ON, because the actual configuration data is lost if the power source is turned OFF. Shown with a specific processing flow, the update determination of the virtual configuration data is not needed in the step S1714 in FIG. 18, the step 1007 is constantly executed.

In the software configuration diagram shown in FIG. 3, the configuration data collecting unit 304 collects actual device configuration data every time the power of the image forming apparatus is turned ON, however, another configuration may be employed. For example, a configuration in which an actual device configuration data holding unit is provided, and the actual device configuration data holding unit constantly stores actual device configuration data in the auxiliary storage device 214 may be employed. In this case, a configuration in which the actual device configuration data held by the actual device configuration data holding unit is promptly rewritten according to the change of the actual device configuration data is needed. Therefore, the configuration data collecting unit 304 needs to monitor the change of the actual device configuration data, and to update the changed content to the actual device configuration data holding unit if the changed content is detected. In addition, the configuration data notification unit 306 is configured to request the actual device configuration data to the actual device configuration data holding unit.

In the software configuration diagram shown in FIG. 3, the tenant identifier holding unit 305 stores the tenant identifier in the auxiliary storage device 214, however, another configuration may be employed. For example, a configuration in which a user inputs the tenant identifier every time by using the input device 216 may be employed. The timing of the input may be upon startup of the image forming apparatus, or a different timing may be available. In this case, the tenant identifier is stored in the volatile memory 213.

In the software configuration diagram shown in FIG. 3, the configuration data notifying unit 306 performs processing by detecting that the power of the image forming apparatus is turned ON, however, another configuration may be employed. For example, a configuration in which a user instructs the acquisition of virtual configuration data by using the input device 216 may be employed. In this case, the configuration is such that, in the step 1101 shown in FIG. 11, the processing after the step 1102 are performed by detecting the virtual configuration data acquiring instruction.

In the software configuration diagram shown in FIG. 3, the virtual device holding unit 351 holds the identifier for identifying virtual device configuration data and virtual configuration data as shown in FIG. 8, however, another configuration may be employed. For example, a configuration in which the substance of data and not the identifier is held, may be employed. In addition, the virtual configuration data generating unit 356 generates virtual configuration data from a model-specific setting value schema, tenant configuration data, and virtual device configuration data, however, another configuration may be employed. For example, a configuration where virtual configuration data depending on the model is generated based on the model-specific setting value schema and tenant configuration data may be employed. In this case, the image forming apparatus is configured to refer to actual configuration data depending on device configuration if referring to actual configuration data.

Second Embodiment

Next, the second embodiment will be described. In the first embodiment, if the import processing is performed in other devices, the setting change of configuration data is not allowed at the image forming apparatus side. In order to change the setting of configuration data, it is required to await the completion of the import. In contrast, in the present embodiment, a description will be given of a case that configuration data can be temporarily changed at the image forming apparatus side during the import processing. In the present embodiment, the changed configuration data is overwritten with the virtual configuration data changed through the import after the import processing, without notifying the management service 350.

Figure 20:
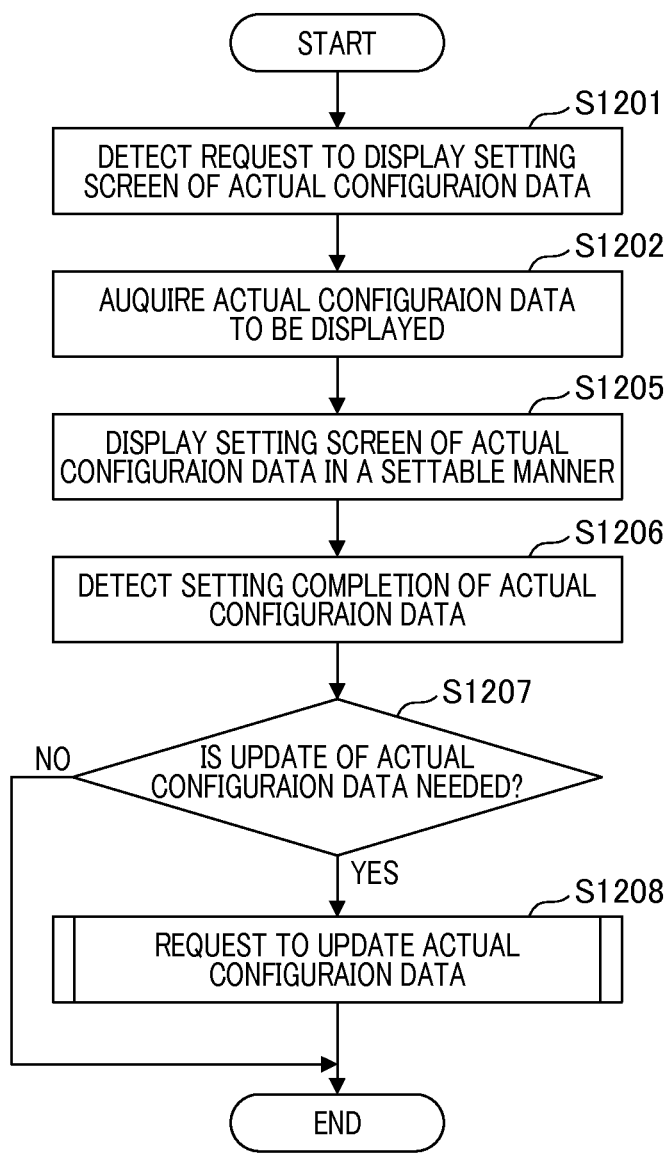
FIG. 20 is a flowchart illustrating an updating processing of configuration data according to the second embodiment.

With respect to the present embodiment, only portions differing from the first embodiment will be described. FIG. 20 is a flowchart that modifies FIG. 12. In other words, the processing in steps S1203 and S1204 are removed from the flowchart explained in FIG. 12. By removing steps S1203 and S1204, the setting screen of configuration data is displayed in a settable manner even if the import processing is performed in another device.

Figure 21:
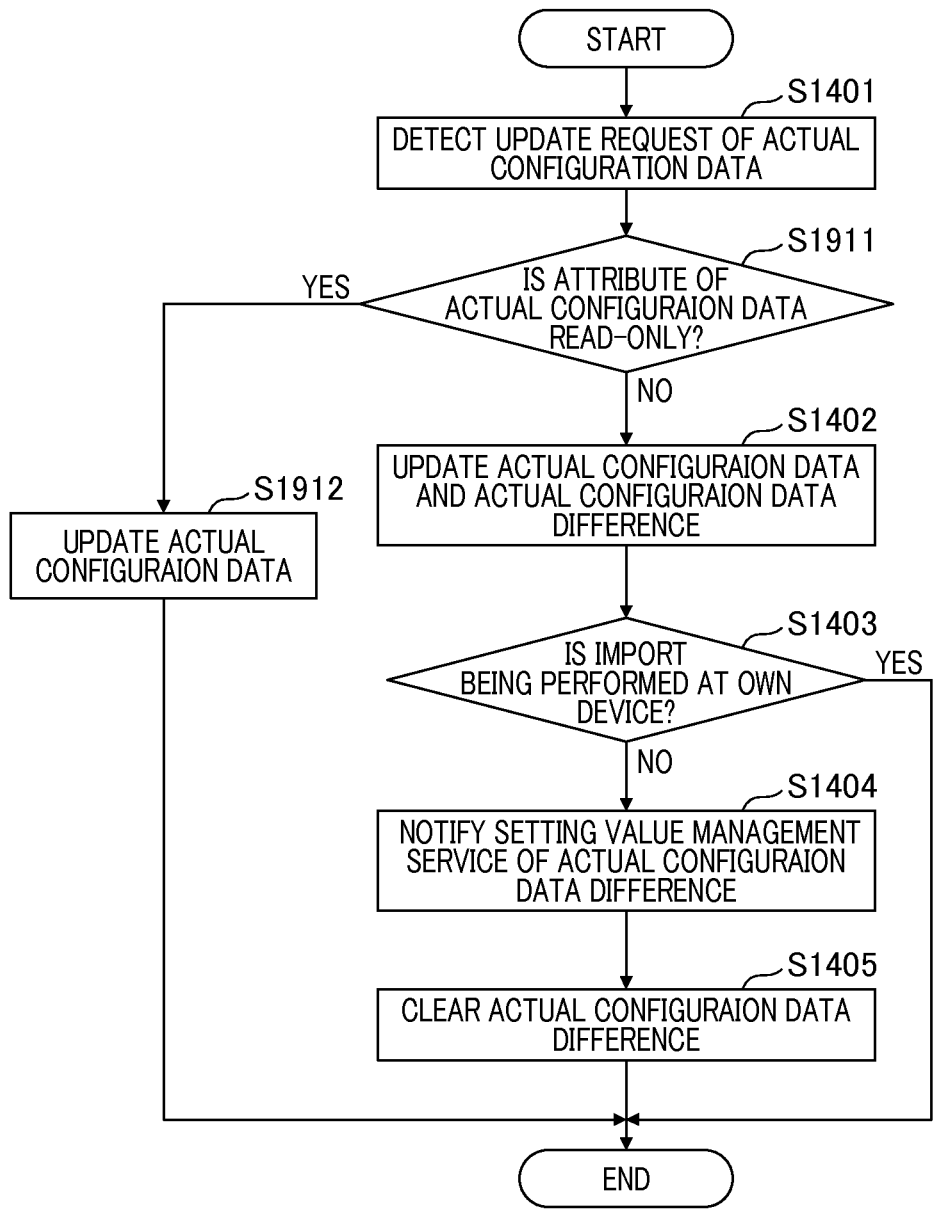
FIG. 21 is a flowchart illustrating an updating processing of actual configuration data according to the second embodiment.

Next, FIG. 21 is a flowchart that modifies FIG. 14. In other words, the processing of steps S1911 and S1912 are added to the flowchart explained in FIG. 14. Accordingly, only portions different from the first embodiment will be described. If the actual configuration data updating request is detected in the step S1401, the actual configuration data setting unit 309 determines whether or not the read-only attribute is held in the attribute holding unit 317 in step S1911. If read-only (YES), the processing proceeds to step S1912. If not read-only (NO), the processing proceeds to step S1402. Then, in the step S1912, the actual configuration data setting unit 309 records configuration data to be updated in the actual configuration data holding unit 301, and the processing ends.

As described above, according to the present embodiment, configuration data can be properly applied to other image forming apparatuses even if the configuration data group is imported at the image forming apparatus side, by allowing temporarily changing configuration data at the image forming apparatus side during the import processing.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-273534, filed Dec. 27, 2013, which is hereby incorporated by reference wherein in its entirety.

What is claimed is:

1. A management system that includes a plurality of network devices and a management server,
    the management server having a management unit configured to manage a setting value to be set in the plurality of network devices in common as master data,
    each network device that is included in the plurality of network devices having a receiving unit configured to transmit an acquisition request of the setting value managed as the master data to the management server and to receive the setting value,
    the plurality of network devices including a first network device,
    the first network device comprising:
        an import unit configured to import a setting value from a USB memory; and
        a notification unit configured to notify an information to the management server, the information showing that the import unit is performing an import processing,
    and
    the management server comprising:
        a first receiving unit configured to receive the information showing that the import processing is performed, from the first network device;
        a second receiving unit configured to receive an update request of the master data from a second network device that is included in the plurality of network devices;
        a determination unit configured to determine whether the first network device performs the import processing, by using the information received by the first receiving unit;
        a response unit configured to respond with an error to the update request from the second network device, when the determination unit determines that the first network device performs the import processing; and
        an update unit performing an update of the master data on the basis of the update request from the second network device, when the determination unit determines that the import processing is not performed in the first network device.

2. The management system according to claim 1, wherein the acquisition request is a request for acquiring a setting value corresponding to a change of the master data from the management server.

3. The management system according to claim 2, wherein the acquisition request is regularly executed.

4. The management system according to claim 1, wherein the response unit responds an error in response to the request from the network device, if the determination unit determines that the import processing is being performed in any of the plurality of network devices even if the import processing is not being performed in the network device.

5. The management system according to claim 1, wherein the notification unit performs a notification of the completion of the import processing after the import processing is completed, and
    wherein the setting value after the import processing is transmitted to the management server.

6. The management system according to claim 1, wherein the network device is a multifunction device.

7. The network device according to claim 1, wherein the import processing acquires import data from a USB interface.

8. A control method of a management system including a plurality of network devices and a management server,
the management server having a management unit configured to manage a setting value to be set in the plurality of network devices in common as master data,
each network device that is included in the plurality of network devices having a receiving unit configured to transmit an acquisition request of the setting value managed as the master data to the management server and to receive the setting value,
the plurality of network devices including a first network device, and
the control method comprising:
importing, by an import unit in the first network device, a setting value from a USB memory;
notifying, by a notification unit in the first network device, an information to the management server, the information showing that the import unit is performing an import processing;
receiving, by a first receiving unit in the management server, the information showing that the import processing is performed, from the first network device;
receiving, by a second receiving unit in the management server, an update request of the master data from a second network device that is included in the plurality of network devices;
determining, by a determination unit in the management server, whether the first network device performs the import processing, by using the information received by the first receiving unit;
responding, by a response unit in the management server, with an error to the update request from the second network device, when the determination unit determines that the first network device performs the import processing; and
updating, by an update unit in the management server, the master data on the basis of the update request from the second network device, when the determination unit determines that the import processing is not performed in the first network device.

9. The control method according to claim 8, wherein the first network device, by a transmission unit, transmits the setting value after the import processing to the management server for applying to the master data, after the import unit performs the import processing; and
the management server, by an application unit, applies the setting value after the import processing, which is transmitted from the transmission unit, in the master data.

10. A non-transitory computer-readable storage medium that stores a program for causing a computer to execute a controlling method executed in a management system including a plurality of network devices and a management server,
the management server having a management unit configured to manage a setting value to be set in the plurality of network devices in common as master data,
each network device that is included in the plurality of network devices having a receiving unit configured to transmit an acquisition request of the setting value managed as the master data to the management server and to receive the setting value,
the plurality of network devices including a first network device, and
the controlling method comprising:
importing, by an import unit in the first network device, a setting value from a USB memory;
notifying, by a notification unit in the first network device, an information to the management server, the information showing that the import unit is performing an import processing;
receiving, by a first receiving unit in the management server, the information showing that the import processing is performed, from the first network device;
receiving, by a second receiving unit in the management server, an update request of the master data from a second network device that is included in the plurality of network devices;
determining, by a determination unit in the management server, whether the first network device performs the import processing, by using the information received by the first receiving unit;
responding, by a response unit in the management server, with an error to the update request from the second network device, when the determination unit determines that the first network device performs the import processing; and
updating, by an update unit in the management server, the master data on the basis of the update request from the second network device, when the determination unit determines that the import processing is not performed in the first network device.

11. The network device according to claim 1, wherein the first network device comprises a transmission unit configured to transmit the setting value after the import processing to the management server for applying to the master data, after the import unit performs the import processing; and
the management server comprises an application unit configured to apply the setting value after the import processing, which is transmitted from the transmission unit, in the master data.

12. A management server that is connected to a plurality of network devices, the management server comprising:
a management unit configured to manage a setting value to be set in the plurality of network devices in common as a master data;
a transmission unit configured to transmit the setting value when receiving an acquisition request of the setting value managed as the master data from each network device that is included in the plurality of network devices;
a first receiving unit configured to receive an information showing that the import processing of the setting value is performed in the first network device, from the first network device that is included in the plurality of network devices;
a second receiving unit configured to receive an update request of the master data from a second network device that is included in the plurality of network devices;
a determination unit configured to determine whether the first network device performs the import processing, by using the information received by the first receiving unit;
a response unit configured to respond with an error to the update request from the second network device, when the determination unit determines that the first network device performs the import processing; and
an update unit performing an update of the master data on the basis of the update request from the second network device, when the determination unit determines that the import processing is not performed in the first network device.

13. The management server according to claim 12, further comprising:
an application unit configured to apply the setting value in the master data when acquiring the setting value after the import processing from the first network device.

14. A control method of a management server that is connected to a plurality of network devices, the control method comprising:
managing, by a management unit, a setting value to be set in the plurality of network devices in common as a master data;
transmitting, by a transmission unit, the setting value when receiving an acquisition request of the setting value managed as the master data from each network device that is included in the plurality of network devices;
receiving, by a first receiving unit, an information showing that the import processing of the setting value is performed in the first network device, from the first network device that is included in the plurality of network devices;
receiving, by a second receiving unit, an update request of the master data from a second network device that is included in the plurality of network devices;
determining, by a determination unit, whether the first network device performs the import processing, by using the information received by the first receiving unit;
responding, by a response unit, with an error to the update request from the second network device, when the determination unit determines that the first network device performs the import processing; and
performing, by an update unit, an update of the master data on the basis of the update request from the second network device, when the determination unit determines that the import processing is not performed in the first network device.

15. The control method according to claim 14, further comprising:
applying, by an application unit, the setting value in the master data when acquiring the setting value after the import processing from the first network device.

16. A non-transitory computer-readable storage medium that stores a program for causing a computer to execute a controlling method executed in a management server that is connected to a plurality of network devices, the controlling method comprising:
managing, by a management unit, a setting value to be set in the plurality of network devices in common as a master data;
transmitting, by a transmission unit, the setting value when receiving an acquisition request of the setting value managed as the master data from each network device that is included in the plurality of network devices;
receiving, by a first receiving unit, an information showing that the import processing of the setting value is performed in the first network device, from the first network device that is included in the plurality of network devices;
receiving, by a second receiving unit, an update request of the master data from a second network device that is included in the plurality of network devices;
determining, by a determination unit, whether the first network device performs the import processing, by using the information received by the first receiving unit;
responding, by a response unit, with an error to the update request from the second network device, when the determination unit determines that the first network device performs the import processing; and
performing, by an update unit, an update of the master data on the basis of the update request from the second network device, when the determination unit determines that the import processing is not performed in the first network device.

17. The non-transitory computer-readable storage medium according to claim 16, further comprising:
applying, by an application unit, the setting value in the master data when acquiring the setting value after the import processing from the first network device.

* * * * *